US012726309B2

(12) United States Patent
Ko et al.

(10) Patent No.: US 12,726,309 B2
(45) Date of Patent: Sep. 1, 2026

(54) METHOD AND DEVICE FOR SETTING SWITCHING GAP IN SL RTT POSITIONING

(71) Applicant: LG Electronics Inc., Seoul (KR)

(72) Inventors: Woosuk Ko, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/280,010

(22) PCT Filed: Apr. 24, 2023

(86) PCT No.: PCT/KR2023/005566

§ 371 (c)(1),
(2) Date: Sep. 1, 2023

(87) PCT Pub. No.: WO2023/211100

PCT Pub. Date: Nov. 2, 2023

(65) Prior Publication Data

US 2025/0047439 A1 Feb. 6, 2025

Related U.S. Application Data

(60) Provisional application No. 63/334,210, filed on Apr. 25, 2022, provisional application No. 63/334,180, filed on Apr. 24, 2022.

(51) Int. Cl.
*H04L 5/00* (2006.01)
*H04W 72/0446* (2023.01)
*H04W 72/25* (2023.01)

(52) U.S. Cl.
CPC .......... *H04L 5/0051* (2013.01); *H04L 5/0055* (2013.01); *H04L 5/0096* (2013.01); *H04W 72/0446* (2013.01); *H04W 72/25* (2023.01)

(58) Field of Classification Search
CPC ... H04L 5/0051; H04L 5/0055; H04L 5/0096; H04W 72/0446; H04W 72/25
See application file for complete search history.

(56) References Cited

U.S. PATENT DOCUMENTS

2022/0086803 A1* 3/2022 Li .................... H04W 72/0453
2023/0224121 A1* 7/2023 Ganesan .............. H04L 5/0051 455/456.1
2024/0007987 A1* 1/2024 Liu .......................... H04L 1/08

FOREIGN PATENT DOCUMENTS

WO 2021/112610 A1 6/2021
WO 2021/133104 A1 7/2021
WO WO-2021223072 A1 * 11/2021 .......... H04L 1/0013

OTHER PUBLICATIONS

Office Action in Korean Appln. No. 10-2023-7028113, mailed on Aug. 1, 2025, 10 pages (with English translation).

* cited by examiner

*Primary Examiner* — Brian P Cox
(74) *Attorney, Agent, or Firm* — Fish & Richardson P.C.

(57) ABSTRACT

Provided are a method for performing wireless communication by a first device, and an apparatus for supporting same. The method may comprise: obtaining sidelink (SL) Positioning Reference Signal (PRS) configuration information including information related to a SL PRS resource; transmitting a first SL PRS on the SL PRS resource to the second device, based on the SL PRS configuration information; and receiving information related to a PRS on a first SL resource after the SL PRS resource from the second device. For example, a switching gap for receiving the information related to the PRS is determined based on the SL PRS resource and the first SL resource.

17 Claims, 21 Drawing Sheets

FIG. 1

Resource grid
k=0
1 RE
1 symbol
l=0
1subcarrier
1RB=12 subcarriers
A BWP
A carrier
(up to 3300 subcarriers,
i.e., 275 RBs)

FIG. 9

E-SMLC

SLP

LMF

NLs

AMF

NG-C (Note 2)

NG-C (Note 2)

TP ng-eNB (Note 1)

TP

Xn gNB (Note 1)

NG-RAN

LTE-Uu

NR-Uu

UE

SET

Figure 18:
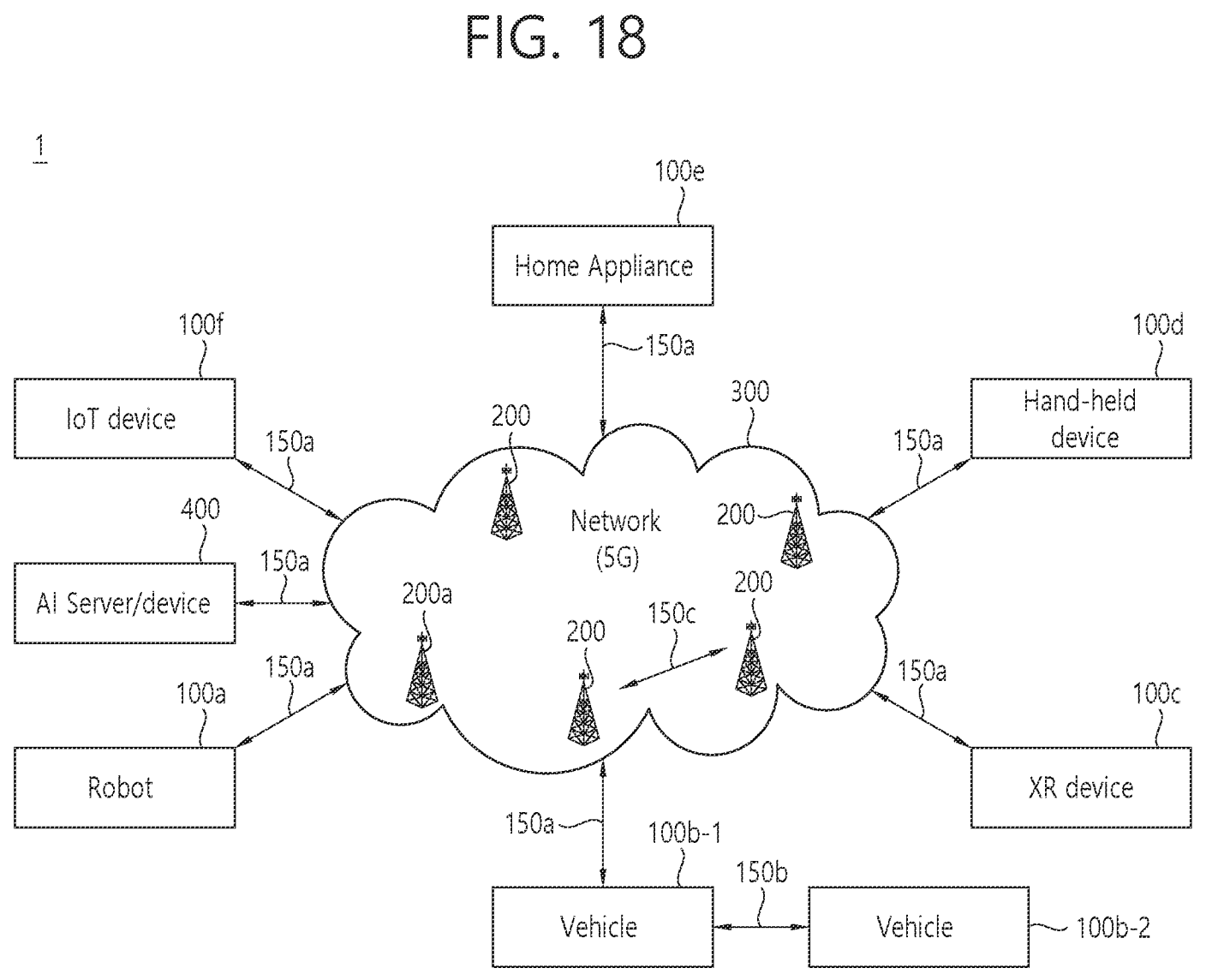

Home Appliance 100e
150a
Hand-held device 100d
150a
XR device 100c
150a
Network (5G) 300
200
200
200
200
200a
150c
Vehicle 100b-1
150a
150b
Vehicle 100b-2
IoT device 100f
150a
AI Server/device 400
150a
Robot 100a
150a

1000(102/106, 202/206)

METHOD AND DEVICE FOR SETTING SWITCHING GAP IN SL RTT POSITIONING

CROSS-REFERENCE TO RELATED APPLICATIONS

This application is a National Stage application under 35 U.S.C. § 371 of International Application No. PCT/KR2023/005566, filed on Apr. 24, 2023, which claims the benefit of U.S. Provisional Application No. 63/334,180, filed on Apr. 24, 2022, and U.S. Provisional Application No. 63/334,210, filed on Apr. 25, 2022. The disclosures of the prior applications are incorporated by reference in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of a base station. SL communication is under consideration as a solution to the overhead of the base station caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

In one embodiment, provided is a method for performing wireless communication by a first device. The method may comprise: obtaining sidelink (SL) Positioning Reference Signal (PRS) configuration information including information related to a SL PRS resource; transmitting a first SL PRS on the SL PRS resource to the second device, based on the SL PRS configuration information; and receiving information related to a PRS on a first SL resource after the SL PRS resource from the second device. For example, a switching gap for receiving the information related to the PRS is determined based on the SL PRS resource and the first SL resource.

In one embodiment, provided is a first device configured to perform wireless communication. The first device may comprise: at least one transceiver; at least one processor; and at least one memory connected to the at least one processor and storing instructions. For example, the instructions, based on being executed by the at least one processor, cause the first device to perform operations comprising: obtaining sidelink (SL) Positioning Reference Signal (PRS) configuration information including information related to a SL PRS resource; transmitting a first SL PRS on the SL PRS resource to the second device, based on the SL PRS configuration information; and receiving information related to a PRS on a first SL resource after the SL PRS resource from the second device. For example, a switching gap for receiving the information related to the PRS is determined based on the SL PRS resource and the first SL resource.

In one embodiment, provided is a processing device configured to control a first device. The processing device may comprise: at least one processor; and at least one memory connected to the at least one processor and storing instructions. For example, the instructions, based on being executed by the at least one processor, cause the first device to perform operations comprising: obtaining sidelink (SL) Positioning Reference Signal (PRS) configuration information including information related to a SL PRS resource; transmitting a first SL PRS on the SL PRS resource to the second device, based on the SL PRS configuration information; and receiving information related to a PRS on a first SL resource after the SL PRS resource from the second device. For example, a switching gap for receiving the information related to the PRS is determined based on the SL PRS resource and the first SL resource.

In one embodiment, provided is a non-transitory computer-readable storage medium recording instructions. For example, the instructions, based on being executed, cause a first device to perform operations comprising: obtaining sidelink (SL) Positioning Reference Signal (PRS) configuration information including information related to a SL PRS resource; transmitting a first SL PRS on the SL PRS resource to the second device, based on the SL PRS configuration information; and receiving information related to a PRS on a first SL resource after the SL PRS resource from the second device. For example, a switching gap for receiving the information related to the PRS is determined based on the SL PRS resource and the first SL resource.

BRIEF DESCRIPTION OF THE DRAWINGS

FIG. 1 shows a communication structure that can be provided in the 6G system, based on an embodiment of the present disclosure.

FIG. 9 shows an example of an architecture of a 5G system capable of positioning a UE having access to a next generation-radio access network (NG-RAN) or an E-UTRAN based on an embodiment of the present disclosure.

FIG. 18 shows a communication system 1, based on an embodiment of the present disclosure.

DETAILED DESCRIPTION

Figure 2:
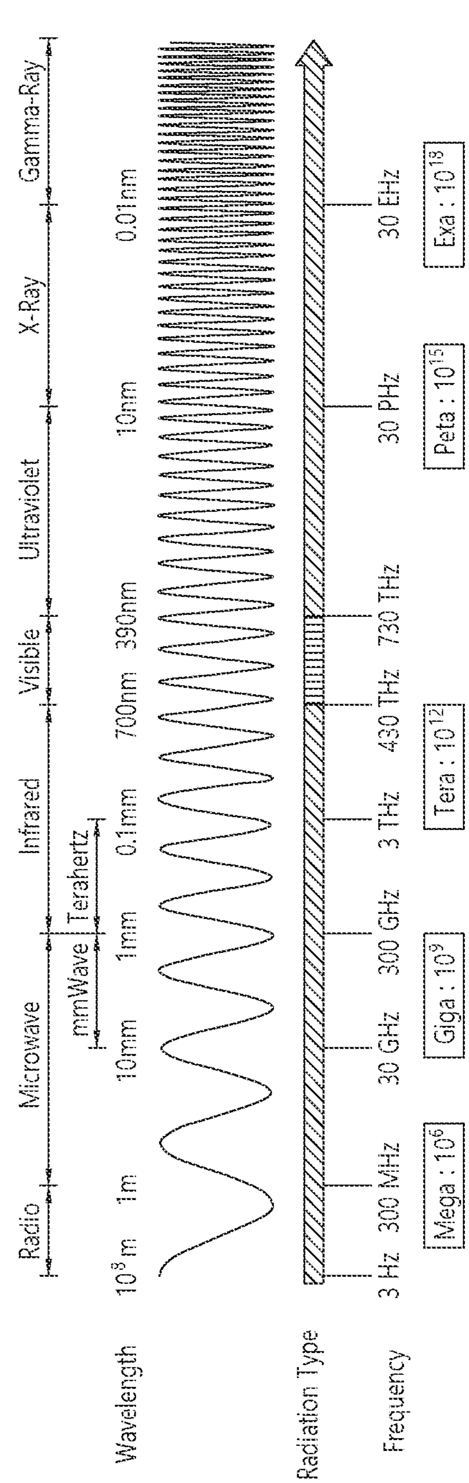
FIG. 2 shows an electromagnetic spectrum, based on an embodiment of the present disclosure.

In the present disclosure, “A or B” may mean “only A”, “only B” or “both A and B.” In other words, in the present disclosure, “A or B” may be interpreted as “A and/or B”. For example, in the present disclosure, “A, B, or C” may mean “only A”, “only B”, “only C”, or “any combination of A, B, C”.

A slash (/) or comma used in the present disclosure may mean “and/or”. For example, “A/B” may mean “A and/or B”. Accordingly, “A/B” may mean “only A”, “only B”, or “both A and B”. For example, “A, B, C” may mean “A. B, or C”.

In the present disclosure, “at least one of A and B” may mean “only A”, “only B”, or “both A and B”. In addition, in the present disclosure, the expression “at least one of A or B” or “at least one of A and/or B” may be interpreted as “at least one of A and B”.

In addition, in the present disclosure, “at least one of A, B, and C” may mean “only A”, “only B”, “only C”, or “any combination of A, B, and C”. In addition, “at least one of A, B, or C” or “at least one of A, B, and/or C” may mean “at least one of A, B, and C”.

In addition, a parenthesis used in the present disclosure may mean “for example”. Specifically, when indicated as “control information (PDCCH)”, it may mean that “PDCCH” is proposed as an example of the “control information”. In other words, the “control information” of the present disclosure is not limited to “PDCCH”, and “PDCCH” may be proposed as an example of the “control information”. In addition, when indicated as “control information (i.e., PDCCH)”, it may also mean that “PDCCH” is proposed as an example of the “control information”.

In the following description, ‘when, if, or in case of’ may be replaced with ‘based on’.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

The 6G (wireless communication) system is aimed at (i) very high data rates per device, (ii) a very large number of connected devices. (iii) global connectivity, (iv) very low latency, (v) lower energy consumption for battery-free IoT devices, (vi) ultra-reliable connectivity, and (vii) connected intelligence with machine learning capabilities. The vision of the 6G system can have four aspects: intelligent connectivity, deep connectivity, holographic connectivity, and ubiquitous connectivity, and the 6G system can satisfy the requirements as shown in Table 1 below. In other words, Table 1 is an example of the requirements of a 6G system.

TABLE 1

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

6G systems can have key elements such as enhanced mobile broadband (eMBB), ultra-reliable low latency communications (URLLC), massive machine-to-machine communications (mMTC). AI-integrated communications, tactile internet, high throughput, high network capacity, high energy efficiency, low backhaul and access network congestion, and enhanced data security.

Figure 1:
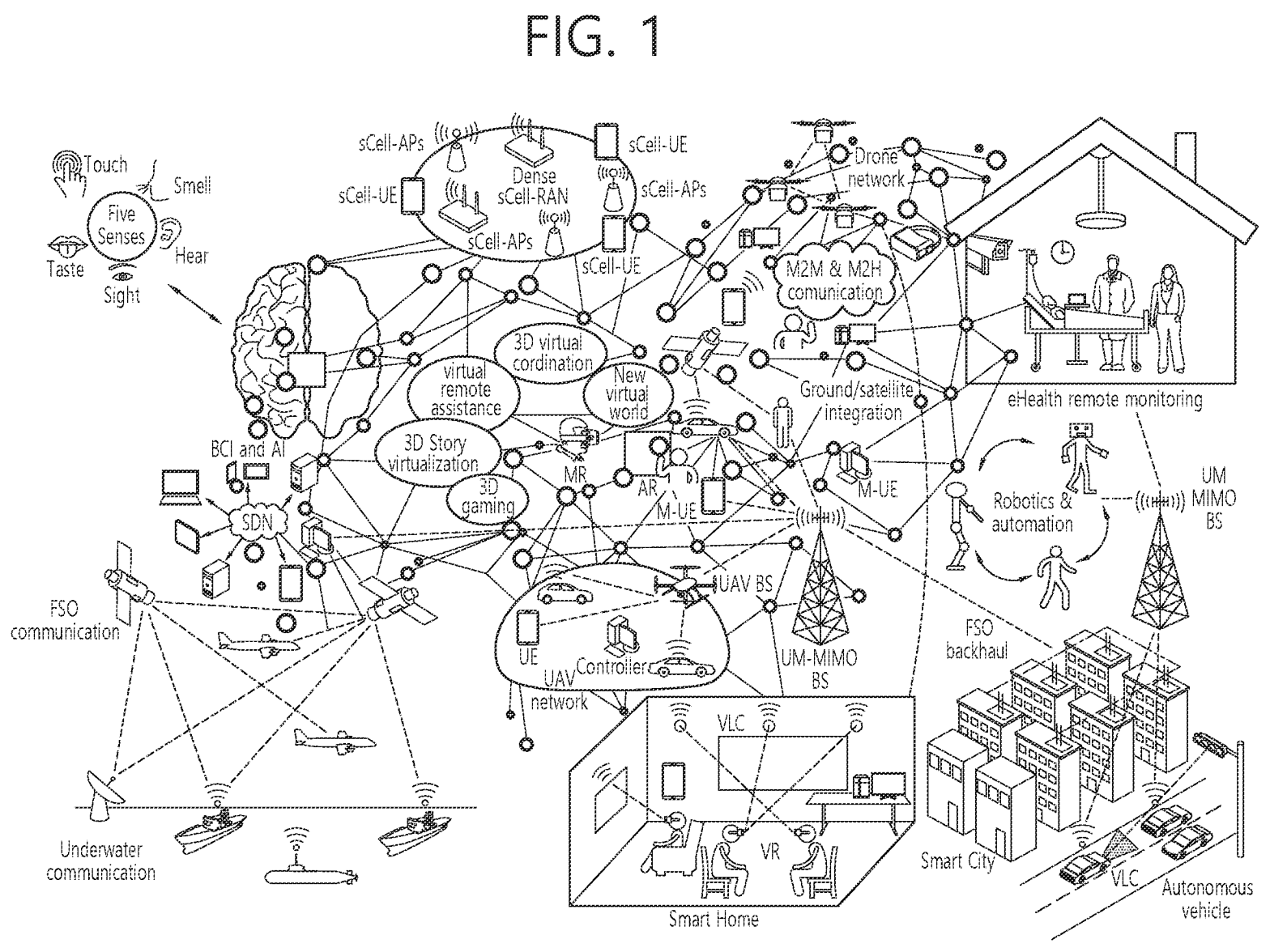

FIG. 1 shows a communication structure that can be provided in the 6G system, based on an embodiment of the present disclosure. The embodiment of FIG. 1 may be combined with various embodiments of the present disclosure.

6G systems are expected to have 50 times higher simultaneous radio connectivity than 5G radio systems. URLLC, a key feature of 5G, will become a more dominant technology in 6G communications, providing end-to-end delay of less than 1 ms. 6G systems will have much better volumetric spectral efficiency as opposed to the more commonly used area spectral efficiency. 6G systems will be able to offer very long battery life and advanced battery technologies for energy harvesting, so mobile devices will not need to be charged separately in a 6G system. New network characteristics in 6G may include the following.

- Satellites integrated network: In order to provide a global mobile population, 6G is expected to be integrated with satellites. The integration of terrestrial, satellite, and airborne networks into a single wireless communication system is critical to 6G.
- Connected intelligence: Unlike previous generations of wireless communication systems, 6G is revolutionary and will update the wireless evolution from "connected things" to "connected intelligence". AI can be applied at each step of the communication process (or each step of signal processing, as we will see later).
- Seamless integration wireless information and energy transfer: 6G wireless networks will transfer power to charge the batteries of devices such as smartphones and sensors. Therefore, wireless information and energy transfer (WIET) will be integrated.
- Ubiquitous super 3D connectivity: Access to networks and core network functions from drones and very low Earth orbit satellites will make super 3D connectivity ubiquitous in 6G.

From the above new network characteristics of 6G, some common requirements may include.

- Small cell networks: The idea of small cell networks was introduced in cellular systems to improve the received signal quality as a result of improved throughput, energy efficiency, and spectral efficiency. As a result, small cell networks are an essential characteristic for 5G and beyond 5G (5 GB) communication systems. Therefore, 6G communication systems will also adopt the characteristics of small cell networks.
- Ultra-dense heterogeneous network: Ultra-dense heterogeneous networks will be another important characteristic of 6G communication systems. Multi-tier networks composed of heterogeneous networks will improve overall QoS and reduce costs.
- High-capacity backhaul: Backhaul connectivity is characterized by high-capacity backhaul networks to support large volumes of traffic. High-speed fiber optics and free-space optics (FSO) systems can be a possible solution to this problem.
- Radar technology integrated with mobile technology: High-precision localization (or location-based services) through communication is one of the features of 6G wireless communication systems. Therefore, radar systems will be integrated with 6G networks.
- Softwarization and virtualization: Softwarization and virtualization are two important features that are fundamental to the design process in a 5 GB network to ensure flexibility, reconfigurability, and programmability. In addition, billions of devices may be shared on a shared physical infrastructure.

The following describes the key enabling technologies for 6G systems.

- Artificial Intelligence: The most important and new technology to be introduced in the 6G system is AI. The 4G system did not involve AI. 5G systems will support partial or very limited AI. However, 6G systems will be AI-enabled for full automation. Advances in machine learning will create more intelligent networks for real-time communication in 6G. The introduction of AI in telecommunications can streamline and improve real-time data transfer. AI can use numerous analytics to determine how complex target tasks are performed, meaning AI can increase efficiency and reduce processing delays. Time-consuming tasks such as handover, network selection, and resource scheduling can be done instantly by using AI. AI can also play an important role in M2M, machine-to-human, and human-to-machine communications. In addition, AI can be a rapid communication in Brain Computer Interface (BCI). AI-based communication systems can be supported by metamaterials, intelligent structures, intelligent networks, intelligent devices, intelligent cognitive radios, self-sustaining wireless networks, and machine learning.
- THz Communication (Terahertz Communication): Data rates can be increased by increasing bandwidth. This can be accomplished by using sub-THz communication with a wide bandwidth and applying advanced massive MIMO technology. THz waves, also known as submillimeter radiation, refer to frequency bands between 0.1 and 10 THz with corresponding wavelengths typically ranging from 0.03 mm-3 mm. The 100 GHz-300 GHz band range (Sub THz band) is considered the main part of the THz band for cellular communications. Adding the Sub-THz band to the mmWave band increases the capacity of 6G cellular communications. Of the defined THz band, 300 GHz-3 THz is in the far infrared (IR) frequency band. The 300 GHz-3 THz band is part of the optical band, but it is on the border of the optical band, just behind the RF band. Thus, the 300 GHz-3 THz band exhibits similarities to RF. FIG. 2 illustrates an electromagnetic spectrum, according to one embodiment of the present disclosure. The embodiment of FIG. 2 may be combined with various embodiments of the present disclosure. Key characteristics of THz communications include (i) widely available bandwidth to support very high data rates, and (ii) high path loss at high frequencies, for which highly directive antennas are indispensable. The narrow beamwidth produced by highly directive antennas reduces interference. The small wavelength of THz signals allows a much larger number of antenna elements to be integrated into devices and BSs operating in this band. This enables the use of advanced adaptive array techniques that can overcome range limitations.

Large-scale MIMO Technology (Large-scale MIMO)

Hologram Beamforming (HBF, Hologram Bmeaforming)

Optical wireless technology

Free-space optical transmission backhaul network (FSO Backhaul Network)

Non-Terrestrial Networks (NTN)

Quantum Communication

Cell-free Communication

Integration of Wireless Information and Power Transmission

Integration of Wireless Communication and Sensing

Integrated Access and Backhaul Network

Big data Analysis

Reconfigurable Intelligent Surface (Reconfigurable Intelligent Surface)

Metaverse

Block-chain

Unmanned aerial vehicles (UAVs): Unmanned aerial vehicles (UAVs) or drones will be an important component of 6G wireless communications. In most cases, high-speed data wireless connectivity will be provided using UAV technology. BS entities are installed on UAVs to provide cellular connectivity. UAVs have certain features not found in fixed BS infrastructure, such as easy deployment, strong line-of-sight links, and controlled degrees of freedom for mobility. During emergencies, such as natural disasters, the deployment of terrestrial telecom infrastructure is not economically feasible and sometimes cannot provide services in volatile environments. UAVs can easily handle these situations. UAVs will be a new paradigm in wireless communications. This technology facilitates the three basic requirements of wireless networks, which are eMBB, URLLC, and mMTC. UAVs can also support many other purposes such as enhancing network connectivity, fire detection, disaster emergency services, security and surveillance, pollution monitoring, parking monitoring, accident monitoring, etc. Therefore, UAV technology is recognized as one of the most important technologies for 6G communications.

Autonomous Driving (Autonomous Driving, Self-driving): For complete autonomous driving, vehicle-to-vehicle communication is required to inform each other of dangerous situations, and vehicle-to-vehicle communication with infrastructure such as parking lots and traffic lights is required to check information such as the location of parking information and signal change times. Vehicle to Everything (V2X), a key element in building an autonomous driving infrastructure, is a technology that enables vehicles to communicate and share information with various elements on the road, such as vehicle-to-vehicle (V2V) and vehicle-to-infrastructure (V2I) wireless communication, in order to perform autonomous driving. In order to maximize the performance of autonomous driving and ensure high safety, fast transmission speeds and low latency technologies are essential. In addition, in the future, autonomous driving will go beyond delivering warnings or guidance messages to the driver to actively intervene in vehicle operation and directly control the vehicle in dangerous situations, so the amount of information that needs to be transmitted and received will be vast, and 6G is expected to maximize autonomous driving with faster transmission speeds and lower latency than 5G.

For clarity of description, 5G NR is mainly described, but the technical idea according to an embodiment of the present disclosure is not limited thereto. Various embodiments of the present disclosure may also be applied to a 6G communication system.

Figure 3:
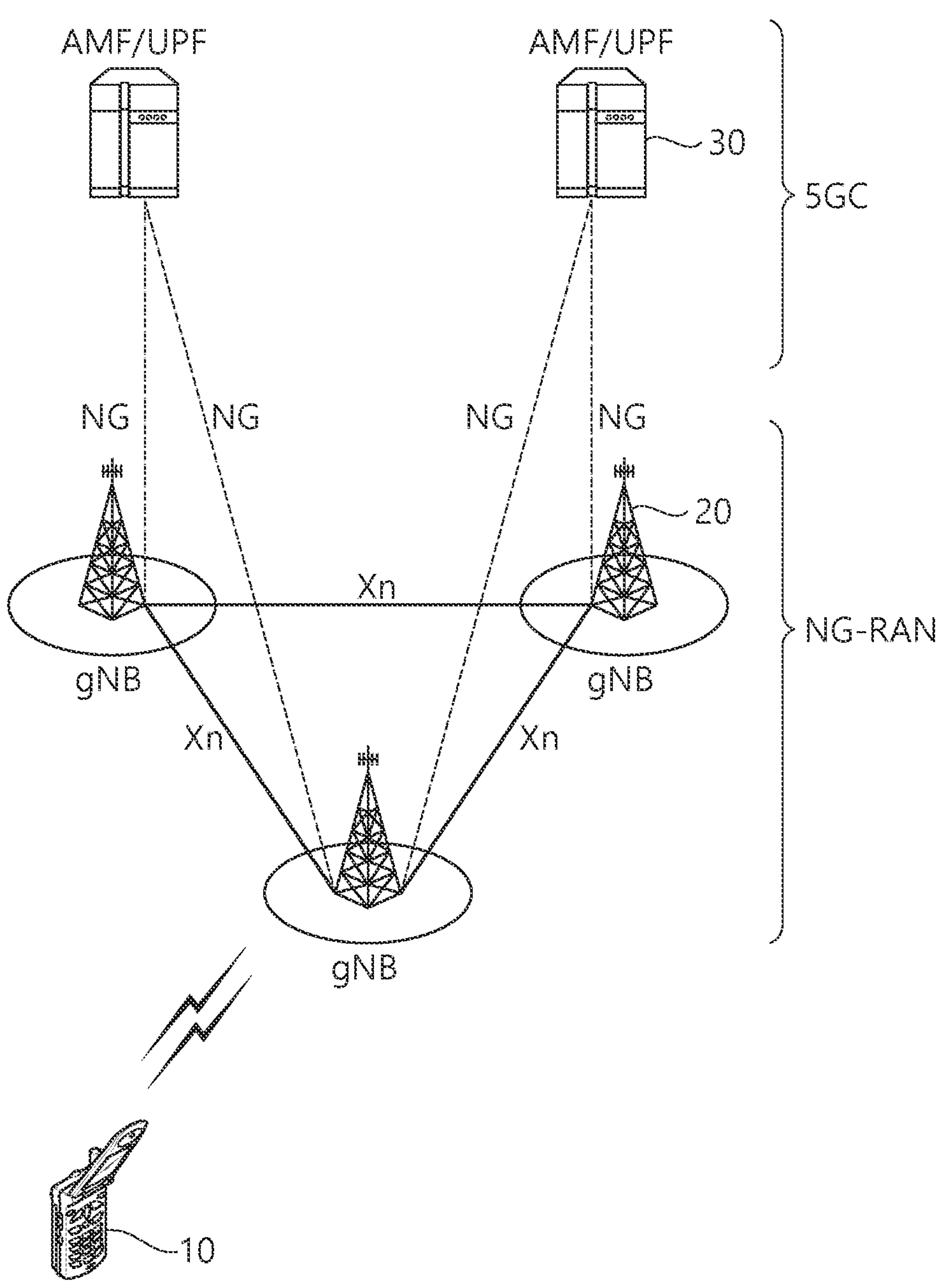
FIG. 3 shows a structure of an NR system, based on an embodiment of the present disclosure.

FIG. 3 shows a structure of an NR system, based on an embodiment of the present disclosure. The embodiment of FIG. 3 may be combined with various embodiments of the present disclosure.

Referring to FIG. 3, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 3 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
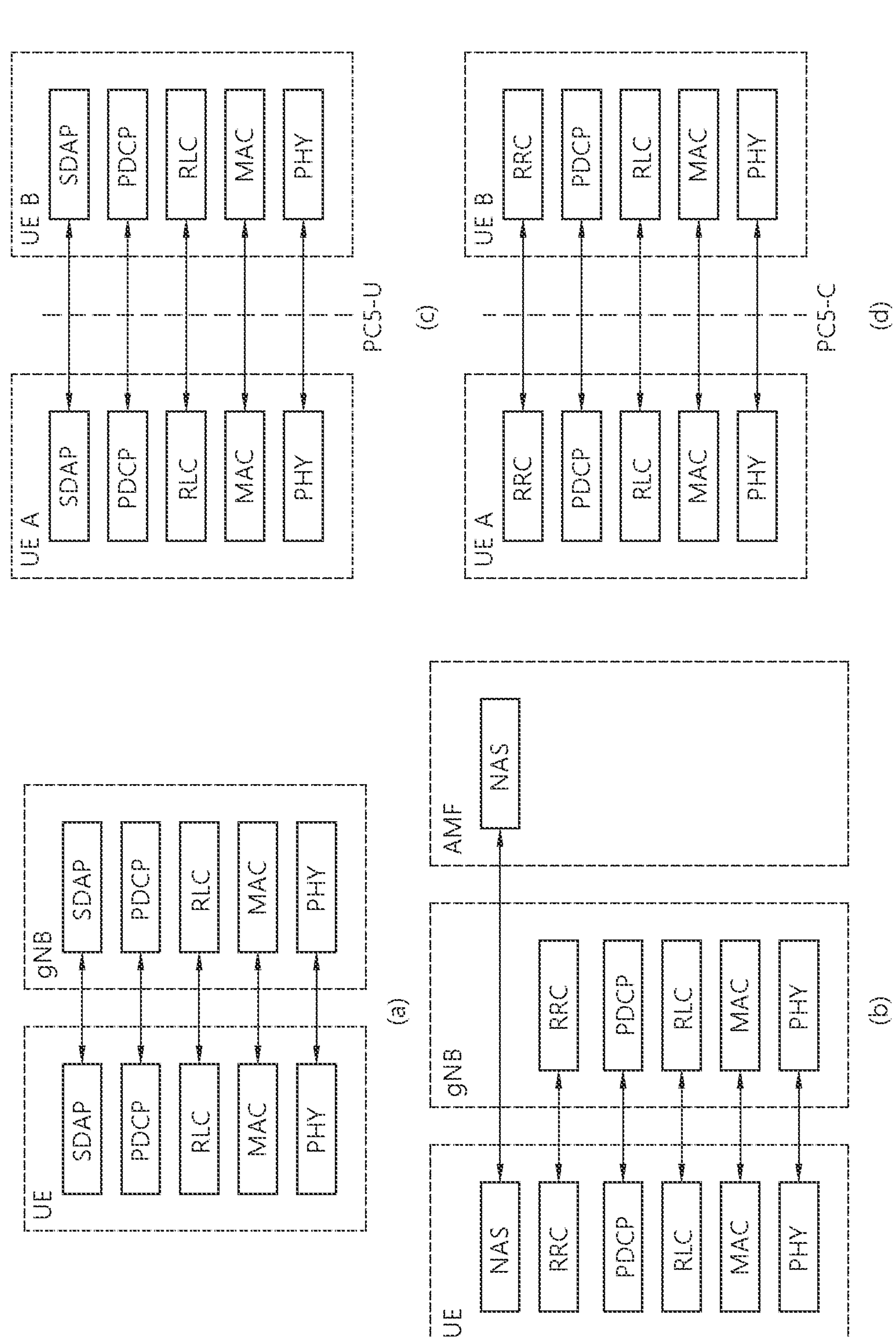
FIG. 4 shows a radio protocol architecture, based on an embodiment of the present disclosure.

FIG. 4 shows a radio protocol architecture, based on an embodiment of the present disclosure. The embodiment of FIG. 4 may be combined with various embodiments of the present disclosure. Specifically, (a) of FIG. 4 shows a radio protocol stack of a user plane for Uu communication, and (b) of FIG. 4 shows a radio protocol stack of a control plane for Uu communication. (c) of FIG. 4 shows a radio protocol stack of a user plane for SL communication, and (d) of FIG. 4 shows a radio protocol stack of a control plane for SL communication.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 5:
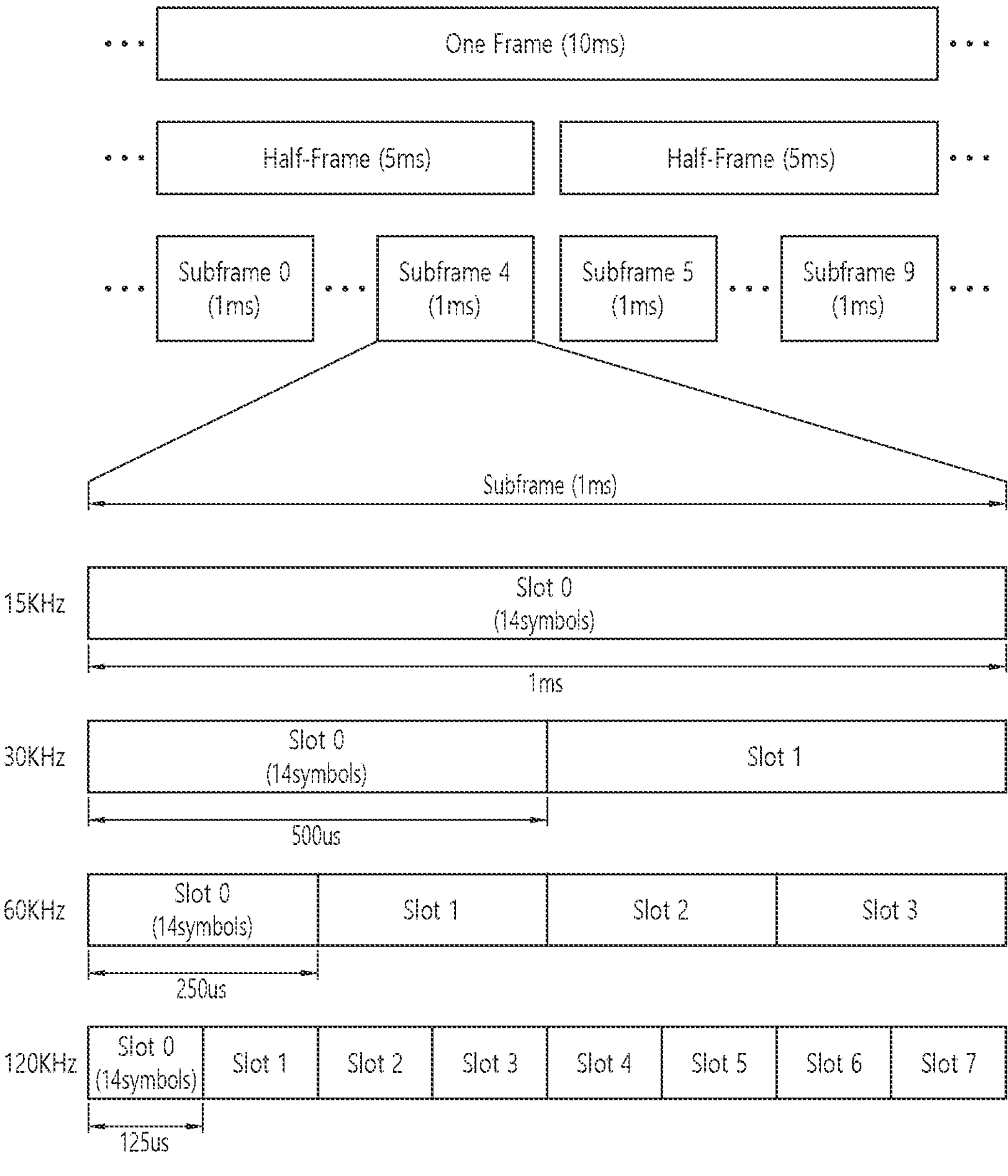
FIG. 5 shows a structure of a radio frame of an NR, based on an embodiment of the present disclosure.

FIG. 5 shows a structure of a radio frame of an NR, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 2 shown below represents an example of a number of symbols per slot ($N^{slot}{}_{symb}$), a number slots per frame $$(N_{slot}^{frame,u}),$$

and a number of slots per subframe $$(N_{slot}^{subframe,u})$$

based on an SCS configuration (u), in a case where a normal CP or extended CP is used.

TABLE 2

| CP type | SCS (15*2^u) | $N_{symb}^{slot}$ | $N_{slot}^{frame,u}$ | $N_{slot}^{subframe,u}$ |
|---|---|---|---|---|
| normal CP | 15 kHz (u = 0) | 14 | 10 | 1 |
| | 30 kHz (u = 1) | 14 | 20 | 2 |
| | 60 kHz (u = 2) | 14 | 40 | 4 |
| | 120 kHz (u = 3) | 14 | 80 | 8 |
| | 240 kHz (u = 4) | 14 | 160 | 16 |
| extended CP | 60 kHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
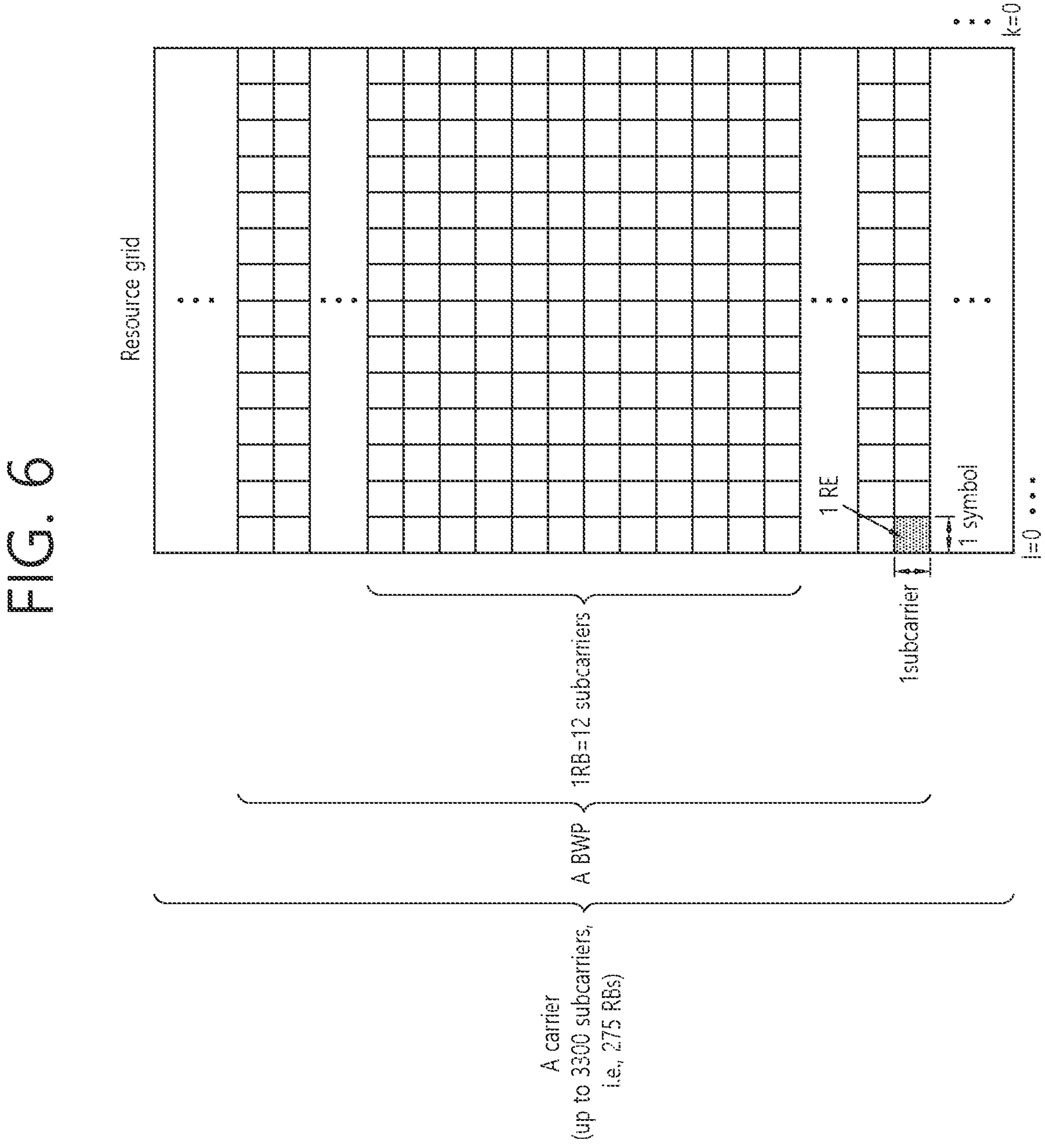
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
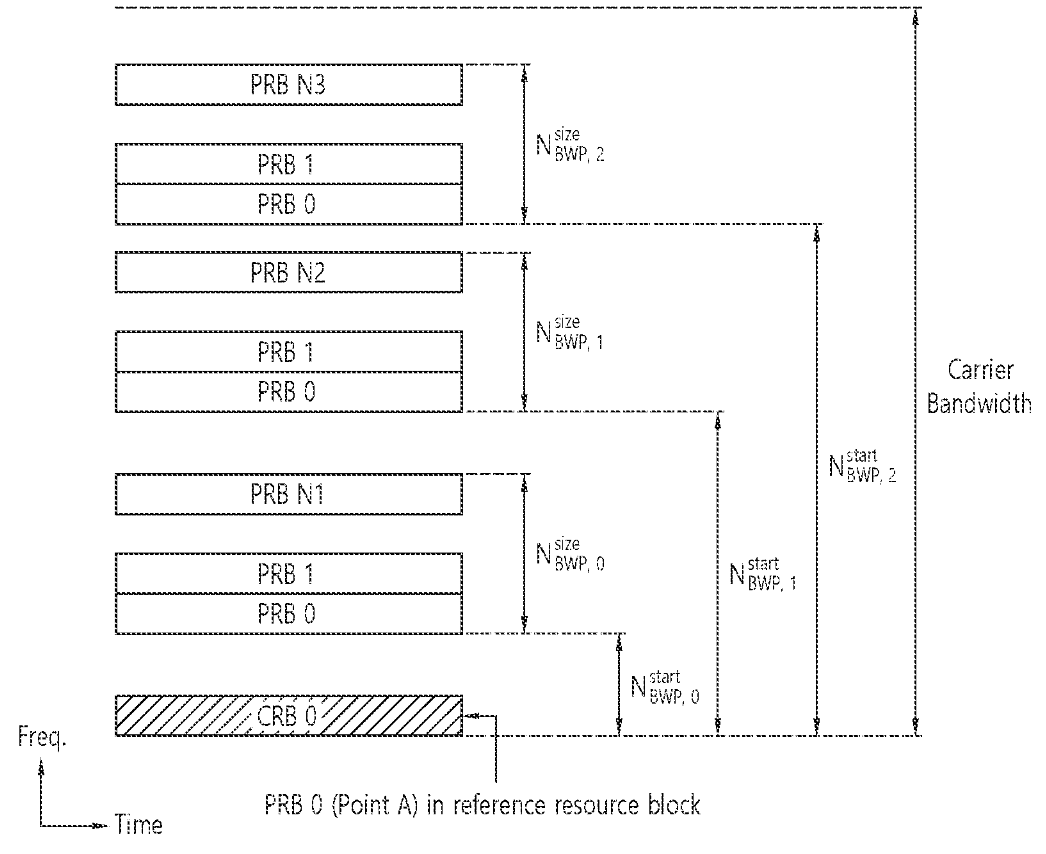
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 8:
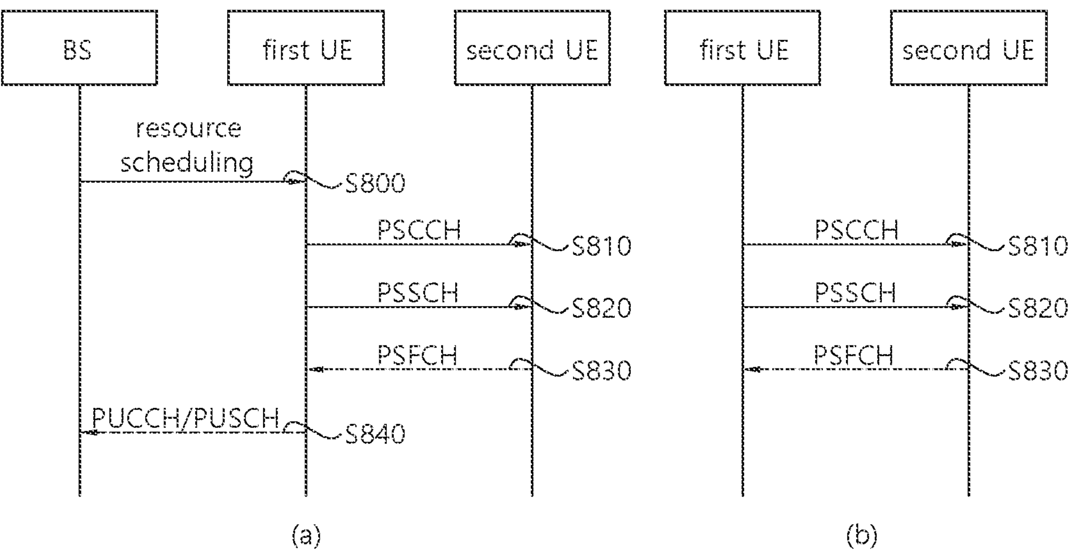
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a base station may schedule SL resource(s) to be used by a UE for SL transmission. For example, in step S800, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S810, the first UE may transmit a PSCCH (e.g., sidelink control information (SCI) or $1^{st}$-stage SCI) to a second UE based on the resource scheduling. In step S820, the first UE may transmit a PSSCH (e.g., $2^{nd}$-stage SCI, MAC PDU, data, etc.) related to the PSCCH to the second UE. In step S830, the first UE may receive a PSFCH related to the PSCCH/PSSCH from the second UE. For example, HARQ feedback information (e.g., NACK information or ACK information) may be received from the second UE through the PSFCH. In step S840, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Hereinafter, an example of DCI format 3_0 will be described.

DCI format 3_0 is used for scheduling of NR PSCCH and NR PSSCH in one cell.

The following information is transmitted by means of the DCI format 3_0 with CRC scrambled by SL-RNTI or SL-CS-RNTI:

- Resource pool index—ceiling ($\log_2$, I) bits, where I is the number of resource pools for transmission configured by the higher layer parameter sl-TxPoolScheduling.
- Time gap—3 bits determined by higher layer parameter sl-DCI-ToSL-Trans
- HARQ process number—4 bits
- New data indicator—1 bit
- Lowest index of the subchannel allocation to the initial transmission—ceiling $$\left(\log_2\left(N_{subChannel}^{SL}\right)\right)\text{bits}$$

- SCI format 1-A fields: frequency resource assignment, time resource assignment
- PSFCH-to-HARQ feedback timing indicator—ceiling ($\log_2 N_{fb\_timing}$) bits, where $N_{fb\_timing}$ is the number of entries in the higher layer parameter sl-PSFCH-To-PUCCH.
- PUCCH resource indicator—3 bits Configuration index—0 bit if the UE is not configured to monitor DCI format 3_0 with CRC scrambled by SL-CS-RNTI; otherwise 3 bits. If the UE is configured to monitor DCI format 3_0 with CRC scrambled by SL-CS-RNTI, this field is reserved for DCI format 3_0 with CRC scrambled by SL-RNTI.

Counter sidelink assignment index—2 bits, 2 bits if the UE is configured with pdsch-HARQ-ACK-Codebook=dynamic, 2 bits if the UE is configured with pdsch-HARQ-ACK-Codebook=semi-static Padding bits, if required Referring to (b) of FIG. 8, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S810, a first UE which has selected resource(s) from a resource pool by itself may transmit a PSCCH (e.g., sidelink control information (SCI) or $1^{st}$-stage SCI) to a second UE by using the resource(s). In step S820, the first UE may transmit a PSSCH (e.g., $2^{nd}$-stage SCI, MAC PDU, data, etc.) related to the PSCCH to the second UE. In step S830, the first UE may receive a PSFCH related to the PSCCH/PSSCH from the second UE.

Referring to (a) or (b) of FIG. 8, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B.

Hereinafter, an example of SCI format 1-A will be described.

SCI format 1-A is used for the scheduling of PSSCH and $2^{nd}$-stage-SCI on PSSCH.

The following information is transmitted by means of the SCI format 1-A:

Priority—3 bits

Frequency resource assignment—ceiling $$\left(\log_2\left(N^{SL}_{subChannel}\left(N^{SL}_{subChannel}+1\right)/2\right)\right) \text{ bits}$$

bits when the value of the higher layer parameter sl-MaxNumPerReserve is configured to 2; otherwise ceiling $$\log_2\left(N^{SL}_{subChannel}\left(N^{SL}_{subChannel}+1\right)\left(2N^{SL}_{subChannel}+1\right)/6\right)$$

bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling ($\log_2 N_{rsv\_period}$) bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling ($\log_2 N_{pattern}$) bits, where $N_{pattern}$ is the number of DMRS patterns configured by higher layer parameter sl-PSSCH-DMRS-TimePatternList $2^{nd}$-stage SCI format—2 bits as defined in Table 5

Beta_offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits

New data indicator—1 bit

Redundancy version—2 bits

Source ID—8 bits

Destination ID—16 bits

HARQ feedback enabled/disabled indicator—1 bit

Cast type indicator—2 bits as defined in Table 7

CSI request—1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits

New data indicator—1 bit

Redundancy version—2 bits

Source ID—8 bits

Destination ID—16 bits

HARQ feedback enabled/disabled indicator—1 bit

Zone ID—12 bits

Communication range requirement—4 bits determined by higher layer parameter sl-ZoneConfigMCR-Index Referring to (a) or (b) of FIG. 8, in step S830, the first UE may receive the PSFCH. For example, the first UE and the second UE may determine a PSFCH resource, and the second UE may transmit HARQ feedback to the first UE using the PSFCH resource.

Referring to (a) of FIG. 8, in step S840, the first UE may transmit SL HARQ feedback to the base station through the PUCCH and/or the PUSCH.

Hereinafter, a hybrid automatic repeat request (HARQ) procedure will be described.

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

In the present disclosure, HARQ-ACK may be referred to as ACK, ACK information, or positive-ACK information, and HARQ-NACK may be referred to as NACK, NACK information, or negative-ACK information.

Hereinafter, positioning will be described.

Figure 9:
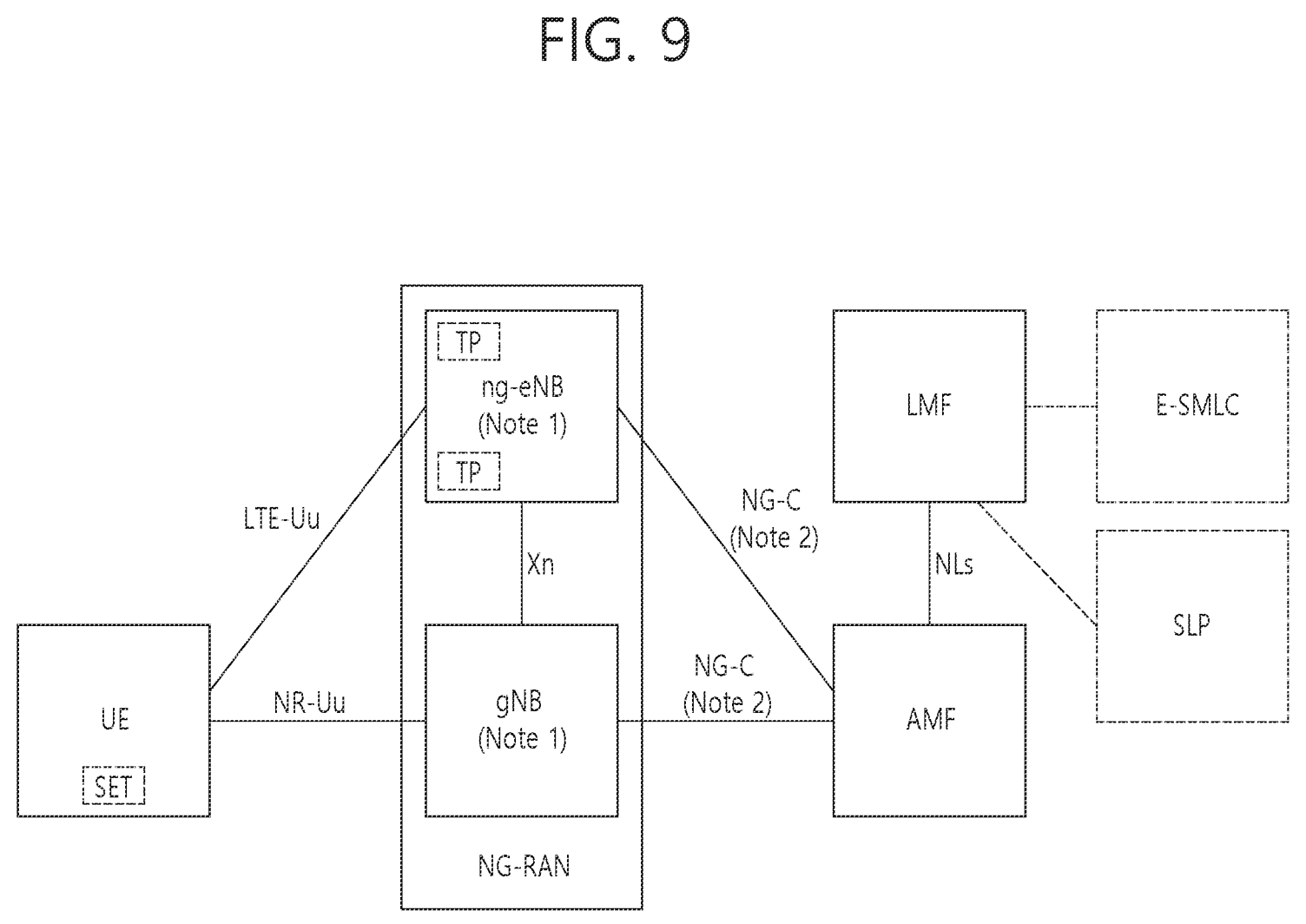

FIG. 9 shows an example of an architecture of a 5G system capable of positioning a UE having access to a next generation-radio access network (NG-RAN) or an E-UTRAN based on an embodiment of the present disclosure. The embodiment of FIG. 9 may be combined with various embodiments of the present disclosure.

Referring to FIG. 9, an AMF may receive a request for a location service related to a specific target UE from a different entity such as a gateway mobile location center (GMLC), or may determine to start the location service in the AMF itself instead of the specific target UE. Then, the AMF may transmit a location service request to a location management function (LMF). Upon receiving the location service request, the LMF may process the location service request and return a processing request including an estimated location or the like of the UE to the AMF. Meanwhile, if the location service request is received from the different entity such as GMLC other than the AMF, the AMF may transfer to the different entity the processing request received from the LMF.

A new generation evolved-NB (ng-eNB) and a gNB are network elements of NG-RAN capable of providing a measurement result for location estimation, and may measure a radio signal for a target UE and may transfer a resultant value to the LMF. In addition, the ng-eNB may control several transmission points (TPs) such as remote radio heads or PRS-dedicated TPs supporting a positioning reference signal (PRS)-based beacon system for E-UTRA.

The LMF may be connected to an enhanced serving mobile location centre (E-SMLC), and the E-SMLC may allow the LMF to access E-UTRAN. For example, the E-SMLC may allow the LMF to support observed time difference of arrival (OTDOA), which is one of positioning methods of E-UTRAN, by using downlink measurement obtained by a target UE through a signal transmitted from the gNB and/or the PRS-dedicated TPs in the E-UTRAN.

Meanwhile, the LMF may be connected to an SUPL location platform (SLP). The LMF may support and manage different location determining services for respective target UEs. The LMF may interact with a serving ng-eNB or serving gNB for the target UE to obtain location measurement of the UE. For positioning of the target UE, the LMF may determine a positioning method based on a location service (LCS) client type, a requested quality of service (QoS), UE positioning capabilities, gNB positioning capabilities, and ng-eNB positioning capabilities, or the like, and may apply such a positioning method to the serving gNB and/or the serving ng-eNB. In addition, the LMF may determine additional information such as a location estimation value for the target UE and accuracy of location estimation and speed. The SLP is a secure user plane location (SUPL) entity in charge of positioning through a user plane.

The UE may measure a downlink signal through NG-RAN, E-UTRAN, and/or other sources such as different global navigation satellite system (GNSS) and terrestrial beacon system (TBS), wireless local access network (WLAN) access points, Bluetooth beacons, UE barometric pressure sensors or the like. The UE may include an LCS application. The UE may communicate with a network to which the UE has access, or may access the LCS application through another application included in the UE. The LCS application may include a measurement and calculation function required to determine a location of the UE. For example, the UE may include an independent positioning function such as a global positioning system (GPS), and may report the location of the UE independent of NG-RAN transmission. Positioning information obtained independently as such may be utilized as assistance information of the positioning information obtained from the network.

Figure 10:
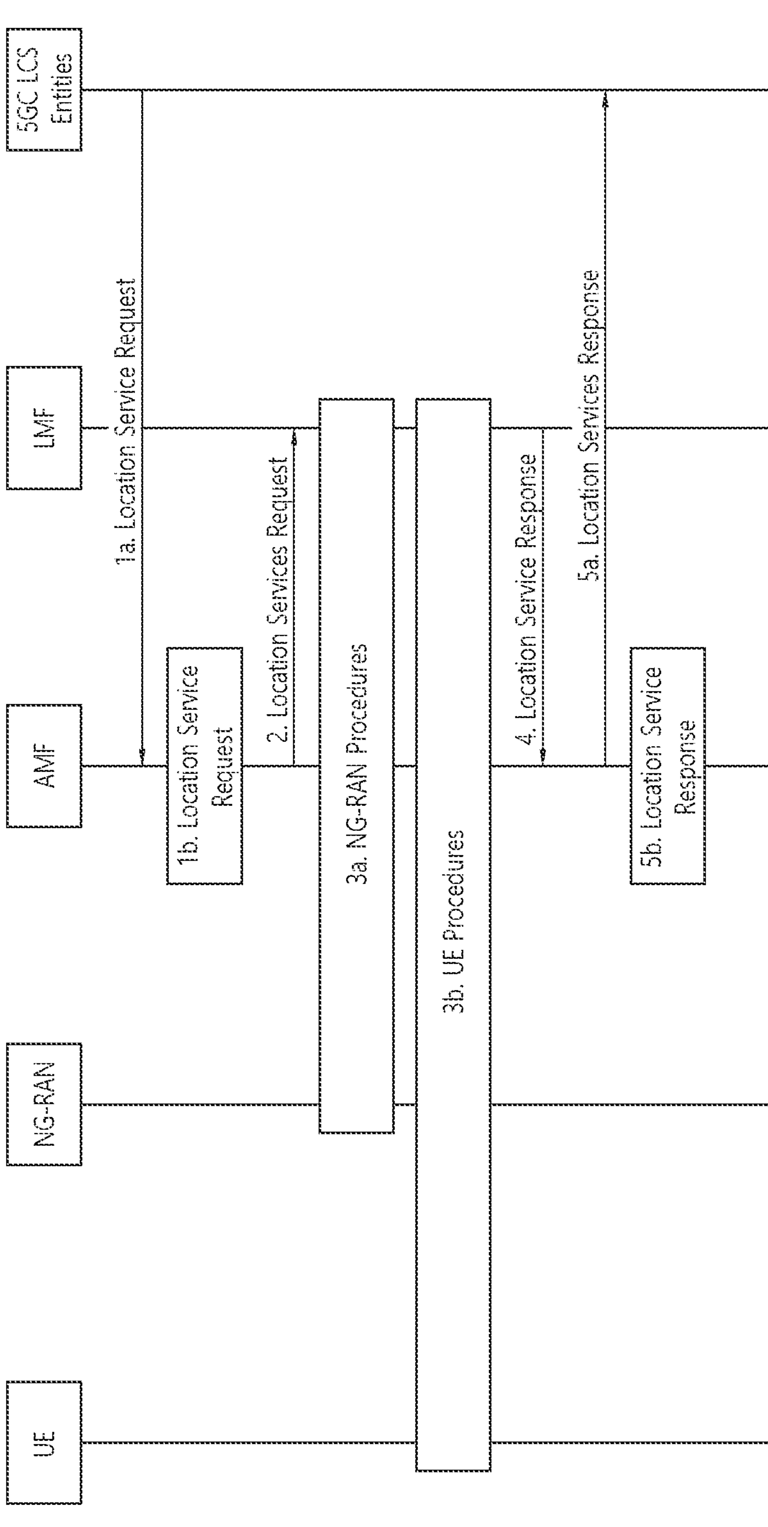
FIG. 10 shows an example of implementing a network for measuring a location of a UE based on an embodiment of the present disclosure.

FIG. 10 shows an example of implementing a network for measuring a location of a UE based on an embodiment of the present disclosure. The embodiment of FIG. 10 may be combined with various embodiments of the present disclosure.

When the UE is in a connection management (CM)-IDLE state, if an AMF receives a location service request, the AMF may establish a signaling connection with the UE, and may request for a network trigger service to allocate a specific serving gNB or ng-eNB. Such an operational process is omitted in FIG. 10. That is, it may be assumed in FIG. 10 that the UE is in a connected mode. However, due to signaling and data inactivation or the like, the signaling connection may be released by NG-RAN while a positioning process is performed.

A network operation process for measuring a location of a UE will be described in detail with reference to FIG. 10. In step a1, a 5GC entity such as GMLC may request a serving AMF to provide a location service for measuring a location of a target UE. However, even if the GMLC does not request for the location service, based on step 1b, the serving AMF may determine that the location service for measuring the location of the target UE is required. For example, to measure the location of the UE for an emergency call, the serving AMF may determine to directly perform the location service.

Thereafter, the AMF may transmit the location service request to an LMF based on step 2, and the LMF may start location procedures to obtain location measurement data or location measurement assistance data together with a serving ng-eNB and a serving gNB. Additionally, based on step 3b, the LMF may start location procedures for downlink positioning together with the UE. For example, the LMF may transmit assistance data defined in 3GPP TS 36.355, or may obtain a location estimation value or a location measurement value. Meanwhile, step 3b may be performed additionally after step 3a is performed, or may be performed instead of step 3a.

In step 4, the LMF may provide a location service response to the AMF. In addition, the location service response may include information on whether location estimation of the UE is successful and a location estimation value of the UE. Thereafter, if the procedure of FIG. 10 is initiated by step a1, the AMF may transfer the location service response to a 5GC entity such as GMLC, and if the procedure of FIG. 10 is initiated by step 1b, the AMF may use the location service response to provide a location service related to an emergency call or the like.

Figure 11:
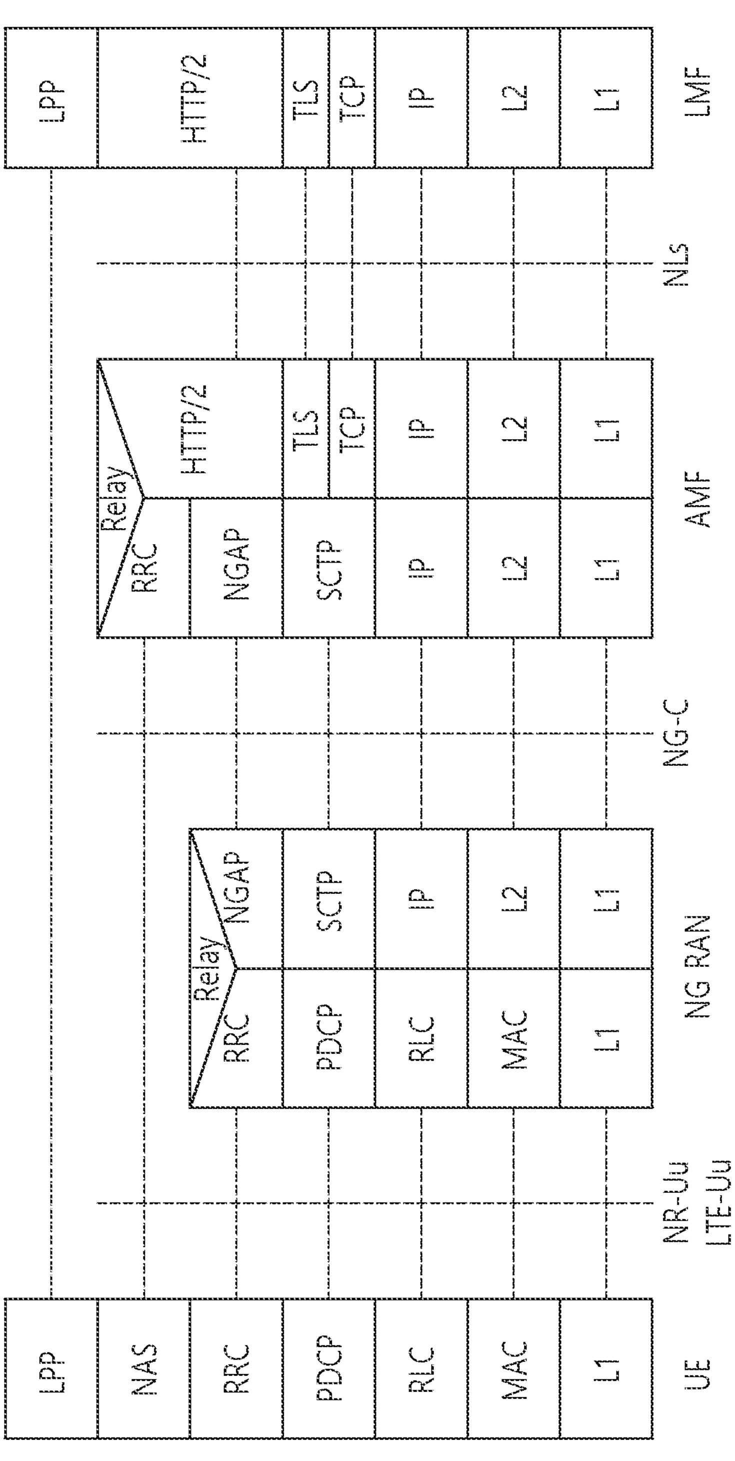
FIG. 11 shows an example of a protocol layer used to support LTE positioning protocol (LPP) message transmission between an LMF and a UE based on an embodiment of the present disclosure.

FIG. 11 shows an example of a protocol layer used to support LTE positioning protocol (LPP) message transmission between an LMF and a UE based on an embodiment of the present disclosure. The embodiment of FIG. 11 may be combined with various embodiments of the present disclosure.

An LPP PDU may be transmitted through a NAS PDU between an AMF and the UE. Referring to FIG. 11, an LPP may be terminated between a target device (e.g., a UE in a control plane or an SUPL enabled terminal (SET) in a user plane) and a location server (e.g., an LMF in the control plane and an SLP in the user plane). The LPP message may be transferred in a form of a transparent PDU through an intermediary network interface by using a proper protocol such as an NG application protocol (NGAP) through an NG-control plane (NG-C) interface and NAS/RRC or the like through an NR-Uu interface. The LPP protocol may enable positioning for NR and LTE by using various positioning methods.

For example, based on the LPP protocol, the target device and the location server may exchange mutual capability information, assistance data for positioning, and/or location information. In addition, an LPP message may be used to indicate exchange of error information and/or interruption of the LPP procedure.

Figure 12:
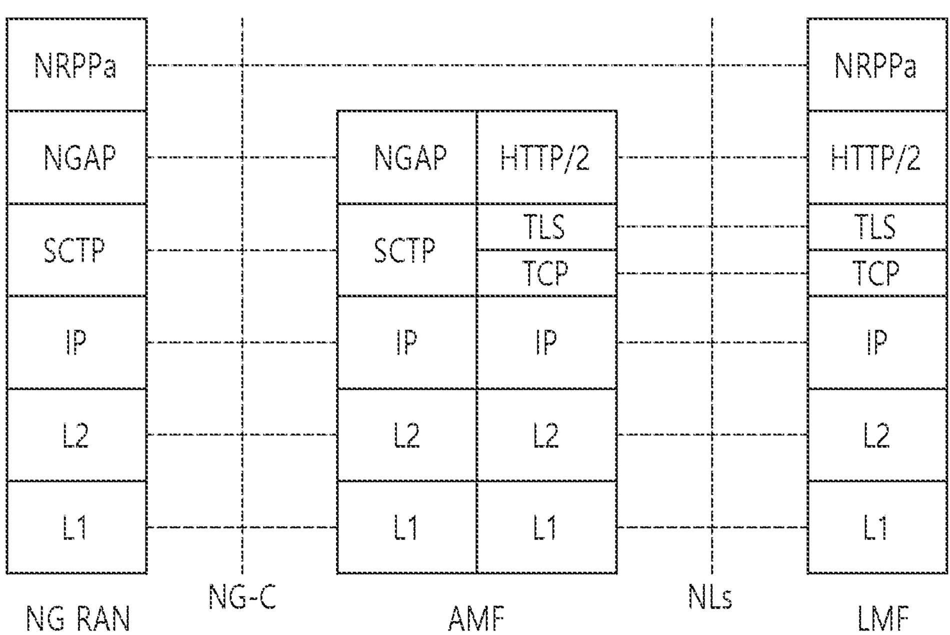
FIG. 12 shows an example of a protocol layer used to support NR positioning protocol A (NRPPa) PDU transmission between an LMF and an NG-RAN node based on an embodiment of the present disclosure.

FIG. 12 shows an example of a protocol layer used to support NR positioning protocol A (NRPPa) PDU transmission between an LMF and an NG-RAN node based on an embodiment of the present disclosure. The embodiment of FIG. 12 may be combined with various embodiments of the present disclosure.

The NRPPa may be used for information exchange between the NG-RAN node and the LMF. Specifically, the NRPPa may exchange an enhanced-cell ID (E-CID) for measurement, data for supporting an OTDOA positioning method, and a cell-ID, cell location ID, or the like for an NR cell ID positioning method, transmitted from the ng-eNB to the LMF. Even if there is no information on an associated NRPPa transaction, the AMF may route NRPPa PDUs based on a routing ID of an associated LMR through an NG-C interface.

A procedure of an NRPPa protocol for location and data collection may be classified into two types. A first type is a UE associated procedure for transferring information on a specific UE (e.g., location measurement information or the like), and a second type is a non UE associated procedure for transferring information (e.g., gNB/ng-eNB/TP timing information, etc.) applicable to an NG-RAN node and associated TPs. The two types of the procedure may be independently supported or may be simultaneously supported.

Meanwhile, examples of positioning methods supported in NG-RAN may include GNSS, OTDOA, enhanced cell ID (E-CID), barometric pressure sensor positioning, WLAN positioning, Bluetooth positioning and terrestrial beacon system (TBS), uplink time difference of arrival (UTDOA), etc.

(1) OTDOA (Observed Time Difference Of Arrival)

Figure 13:
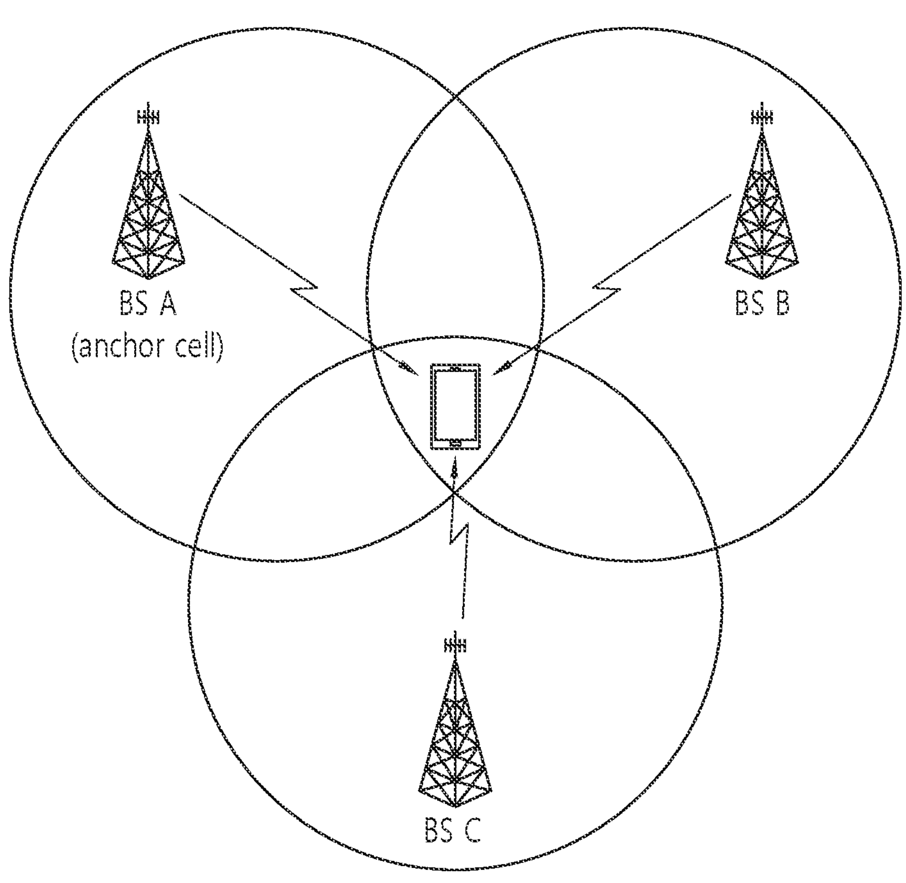
FIG. 13 is a drawing for explaining an OTDOA positioning method based on an embodiment of the present disclosure.

FIG. 13 is a drawing for explaining an OTDOA positioning method based on an embodiment of the present disclosure. The embodiment of FIG. 13 may be combined with various embodiments of the present disclosure.

The OTDOA positioning method uses measurement timing of downlink signals received by a UE from an eNB, an ng-eNB, and a plurality of TPs including a PRS-dedicated TP. The UE measures timing of downlink signals received by using location assistance data received from a location server. In addition, a location of the UE may be determined based on such a measurement result and geometric coordinates of neighboring TPs.

A UE connected to a gNB may request for a measurement gap for OTDOA measurement from the TP. If the UE cannot recognize a single frequency network (SFN) for at least one TP in the OTDOA assistance data, the UE may use an autonomous gap to obtain an SNF of an OTDOA reference cell before the measurement gap is requested to perform reference signal time difference (RSTD) measurement.

Herein, the RSTD may be defined based on a smallest relative time difference between boundaries of two subframes received respectively from a reference cell and a measurement cell. That is, the RSTD may be calculated based on a relative time difference between a start time of a subframe received from the measurement cell and a start time of a subframe of a reference cell closest to the start time of the subframe received from the measurement cell. Meanwhile, the reference cell may be selected by the UE.

For correct OTDOA measurement, it may be necessary to measure a time of arrival (TOA) of a signal received from three or more TPs or BSs geometrically distributed. For example, a TOA may be measured for each of a TP1, a TP2, and a TP3, and RSTD for TP 1–TP 2, RSTD for TP 2–TP 3, and RSTD for TP 3–TP 1 may be calculated for the three TOAs. Based on this, a geometric hyperbola may be determined, and a point at which these hyperbolas intersect may be estimated as a location of a UE. In this case, since accuracy and/or uncertainty for each TOA measurement may be present, the estimated location of the UE may be known as a specific range based on measurement uncertainty.

For example, RSTD for two TPs may be calculated based on Equation 1.

$$RSTDi,1 = \frac{\sqrt{(x_t - x_i)^2 + (y_t - y_i)^2}}{c} - \frac{\sqrt{(x_t - x_i)^2 + (y_t - y_i)^2}}{c} + (T_i - T_1) + (n_i - n_1) \quad \text{[Equation 1]}$$

Herein, c may be the speed of light, {xt, yt} may be a (unknown) coordinate of a target UE. {xi, yi} may be a coordinate of a (known) TP, and {x1, y1} may be a coordinate of a reference TP (or another TP). Herein, (Ti–T1) may be referred to as "real time differences (RTDs)" as a transmission time offset between two TPs, and ni, n1 may represent values related to UE TOA measurement errors.

(2) E-CID (Enhanced Cell ID)

In a cell ID (CID) positioning method, a location of a UE may be measured through geometric information of a serving ng-eNB, serving gNB, and/or serving cell of the UE. For example, the geometric information of the serving ng-eNB, serving gNB, and/or serving cell may be obtained through paging, registration, or the like.

Meanwhile, in addition to the CID positioning method, an E-CID positioning method may use additional UE measurement and/or NG-RAN radio resources or the like to improve a UE location estimation value. In the E-CID positioning method, although some of the measurement methods which are the same as those used in a measurement control system of an RRC protocol may be used, additional measurement is not performed in general only for location measurement of the UE. In other words, a measurement configuration or a measurement control message may not be provided additionally to measure the location of the UE. Also, the UE may not expect that an additional measurement operation only for location measurement will be requested, and may report a measurement value obtained through measurement methods in which the UE can perform measurement in a general manner.

For example, the serving gNB may use an E-UTRA measurement value provided from the UE to implement the E-CID positioning method.

Examples of a measurement element that can be used for E-CID positioning may be as follows.

UE measurement: E-UTRA reference signal received power (RSRP), E-UTRA reference signal received quality (RSRQ), UE E-UTRA Rx–Tx Time difference, GSM EDGE random access network (GERAN)/WLAN reference signal strength indication (RSSI), UTRAN common pilot channel (CPICH) received signal code power (RSCP), UTRAN CPICH Ec/Io E-UTRAN measurement: ng-eNB Rx–Tx Time difference, timing advance (TADV), angle of arrival (AoA)

Herein, the TADV may be classified into Type 1 and Type 2 as follows.

$$TADV \text{ Type } 1 = (ng - eNB\ Rx - Tx \text{ time difference}) + (UE\ E - UTRA\ Rx - Tx \text{ time difference})$$

$$TADV \text{ Type } 2 = ng - eNB\ Rx - Tx \text{ time difference}$$

Meanwhile, AoA may be used to measure a direction of the UE. The AoA may be defined as an estimation angle with respect to the location of the UE counterclockwise from a BS/TP. In this case, a geographic reference direction may be north. The BS/TP may use an uplink signal such as a sounding reference signal (SRS) and/or a demodulation reference signal (DMRS) for AoA measurement. In addition, the larger the arrangement of the antenna array, the higher the measurement accuracy of the AoA. When the antenna arrays are arranged with the same interval, signals received from adjacent antenna elements may have a constant phase-rotate.

(3) UTDOA (Uplink Time Difference of Arrival)

UTDOA is a method of determining a location of a UE by estimating an arrival time of SRS. When calculating an estimated SRS arrival time, the location of the UE may be estimated through an arrival time difference with respect to another cell (or BS/TP) by using a serving cell as a reference cell. In order to implement the UTDOA, E-SMLC may indicate a serving cell of a target UE to indicate SRS transmission to the target UE. In addition, the E-SMLC may provide a configuration such as whether the SRS is periodical/aperiodical, a bandwidth, frequency/group/sequence hopping, or the like.

(4) RTT (Round Trip Time)

RTT is a positioning technique that can measure the distance between two entities even if the target entity and the server entity are out of time synchronization. If RTT is performed with multiple server entities, the distance from each server entity can be measured separately. Then, by drawing a circle using the measured distance from each server entity, absolute positioning of the target entity can be performed by the point where the circles intersect.

The method of performing RTT between two entities can be performed as follows. Entity #1 may transmit PRS #1 at t1, and Entity #2 may receive the RRS #1 at t2. After the PRS #1 is received by the Entity #2, Entity #2 can transmit PRS #2 at t3, and Entity #1 can receive the PRS #2 at t4. In this case, the distance D between the two entities can be obtained as follows.

$$D = c\times\{(t4-t1)-(t3-t2)\}/2(\text{where } c \text{ is the speed of light})$$

For RTT between UE and gNB, the distance between UE and gNB can be found based on the above formula using the UE Rx−Tx time difference and gNB Rx−Tx time difference in the table below.

Table 8 shows an example of reference signal time difference (RSTD). The RSTD of Table 8 may be applied for SL positioning.

TABLE 8

| | |
|---|---|
| Definition | The relative timing difference between the E-UTRA neighbour cell j and the E-UTRA reference cell i, defined as $T_{SubframeRxj} - T_{SubframeRxi}$, where: $T_{SubframeRxj}$ is the time when the UE receives the start of one subframe from E-UTRA cell j $T_{SubframeRxi}$ is the time when the UE receives the corresponding start of one subframe from E-UTRA cell i that is closest in time to the subframe received from E-UTRA cell j. The reference point for the observed subframe time difference shall be the antenna connector of the UE. |
| Applicable for | RRC_CONNECTED inter-RAT |

Table 9 shows an example of DL PRS reference signal received power (RSRP). The DL PRS RSRP of Table 9 may be applied for SL positioning.

TABLE 9

| | |
|---|---|
| Definition | DL PRS reference signal received power (DL PRS-RSRP), is defined as the linear average over the power contributions (in [W]) of the resource elements that carry DL PRS reference signals configured for RSRP measurements within the considered measurement frequency bandwidth. For frequency range 1, the reference point for the DL PRS-RSRP shall be the antenna connector of the UE. For frequency range 2, DL PRS-RSRP shall be measured based on the combined signal from antenna elements corresponding to a given receiver branch. For frequency range 1 and 2, if receiver diversity is in use by the UE, the reported DL PRS-RSRP value shall not be lower than the corresponding DL PRS-RSRP of any of the individual receiver branches. |
| Applicable for | RRC_CONNECTED intra-frequency, RRC_CONNECTED inter-frequency |

Table 10 shows an example of DL relative signal time difference (RSTD). The DL RSTD of Table 10 may be applied for SL positioning.

TABLE 10

| | |
|---|---|
| Definition | DL relative timing difference (DL RSTD) between the positioning node j and the reference positioning node i, is defined as $T_{SubframeRxj} - T_{SubframeRxi}$, Where: $T_{SubframeRxj}$ is the time when the UE receives the start of one subframe from positioning node j. $T_{SubframeRxi}$ is the time when the UE receives the corresponding start of one subframe from positioning node i that is closest in time to the subframe received from positioning node j. Multiple DL PRS resources can be used to determine the start of one subframe from a positioning node. For frequency range 1, the reference point for the DL RSTD shall be the antenna connector of the UE. For frequency range 2, the reference point for the DL RSTD shall be the antenna of the UE. |
| Applicable for | RRC_CONNECTED intra-frequency RRC_CONNECTED inter-frequency |

Table 11 shows an example of UE Rx−Tx time difference. The UE Rx−Tx time difference of Table 11 may be applied for SL positioning.

TABLE 11

| | |
|---|---|
| Definition | The UE Rx − Tx time difference is defined as $T_{UE\text{-}RX} - T_{UE\text{-}TX}$ Where: $T_{UE\text{-}RX}$ is the UE received timing of downlink subframe #i from a positioning node, defined by the first detected path in time. $T_{UE\text{-}TX}$ is the UE transmit timing of uplink subframe #j that is closest in time to the subframe #i received from the positioning node. Multiple DL PRS resources can be used to determine the start of one subframe of the first arrival path of the positioning node. For frequency range 1, the reference point for $T_{UE\text{-}RX}$ measurement shall be the Rx antenna connector of the UE and the reference point for $T_{UE\text{-}TX}$ measurement shall be the Tx antenna connector of the UE. For frequency range 2, the reference point for $T_{UE\text{-}RX}$ measurement shall be the Rx antenna of the UE and the reference point for $T_{UE\text{-}TX}$ measurement shall be the Tx antenna of the UE. |
| Applicable for | RRC_CONNECTED intra-frequency RRC_CONNECTED inter-frequency |

Table 12 shows an example of UL Relative Time of Arrival (UL RTOA) (TUL-RTOA). The UL RTOA of Table 12 may be applied for SL positioning.

TABLE 12

| | |
|---|---|
| Definition | [The UL Relative Time of Arrival ($T_{UL\text{-}RTOA}$) is the beginning of subframe i containing SRS received in positioning node j, relative to the configurable reference time.] |

TABLE 12-continued

| | |
|---|---|
| | Multiple SRS resources for positioning can be used to determine the beginning of one subframe containing SRS received at a positioning node. The reference point for $T_{UL\text{-}RTOA}$ shall be: for type 1-C base station TS 38.104 [9]: the Rx antenna connector, for type 1-O or 2-O base station TS 38.104 [9]: the Rx antenna, for type 1-H base station TS 38.104 [9]: the Rx Transceiver Array Boundary connector. |

Table 13 shows an example of gNB Rx−Tx time difference. The gNB Rx−Tx time difference of Table 13 may be applied for SL positioning.

TABLE 13

| | |
|---|---|
| Definition | The gNB Rx − Tx time difference is defined as $T_{gNB\text{-}RX} - T_{gNB\text{-}TX}$ Where: $T_{gNB\text{-}RX}$ is the positioning node received timing of uplink subframe #i containing SRS associated with UE, defined by the first detected path in time. $T_{gNB\text{-}TX}$ is the positioning node transmit timing of downlink subframe #j that is closest in time to the subframe #i received from the UE. Multiple SRS resources for positioning can be used to determine the start of one subframe containing SRS. The reference point for $T_{gNB\text{-}RX}$ shall be: for type 1-C base station TS 38.104 [9]: the Rx antenna connector, for type 1-O or 2-O base station TS 38.104 [9]: the Rx antenna, for type 1-H base station TS 38.104 [9]: the Rx Transceiver Array Boundary connector. The reference point for $T_{gNB\text{-}TX}$ shall be: for type 1-C base station TS 38.104 [9]: the Tx antenna connector, for type 1-O or 2-O base station TS 38.104 [9]: the Tx antenna, for type 1-H base station TS 38.104 [9]: the Tx Transceiver Array Boundary connector. |

Table 14 shows an example of UL Angle of Arrival (AoA). The UL AoA of Table 14 may be applied for SL positioning.

TABLE 14

| | |
|---|---|
| Definition | UL Angle of Arrival (UL AoA) is defined as the estimated azimuth angle and vertical angle of a UE with respect to a reference direction, wherein the reference direction is defined: In the global coordinate system (GCS), wherein estimated azimuth angle is measured relative to geographical North and is positive in a counter-clockwise direction and estimated vertical angle is measured relative to zenith and positive to horizontal direction In the local coordinate system (LCS), wherein estimated azimuth angle is measured relative to x-axis of LCS and positive in a counter-clockwise direction and estimated vertical angle is measured relatize to z-axis of LCS and positive to x-y plane direction. The bearing, downtilt and slant angles of LCS are defined according to TS 38.901 [14]. The UL AoA is determined at the gNB antenna for an UL channel corresponding to this UE. |

Table 15 shows an example of UL SRS reference signal received power (RSRP). The UL SRS RSRP of Table 15 may be applied for SL positioning.

TABLE 15

| | |
|---|---|
| Definition | UL SRS reference signal received power (UL SRS-RSRP) is defined as linear average of the power contributions (in [W]) of the resource elements carrying sounding reference signals (SRS). UL SRS-RSRP shall be measured over the configured resource elements within the considered measurement frequency bandwidth in the configured measurement time occasions. For frequency range 1, the reference point for the UL SRS-RSRP shall be the antenna connector of the gNB. For frequency range 2, UL SRS-RSRP shall be measured based on the combined signal from antenna elements corresponding to a given receiver branch. For frequency range 1 and 2, if receiver diversity is in use by the gNB, the reported UL SRS-RSRP value shall not be lower than the corresponding UL SRS-RSRP of any of the individual receiver branches. |

The following describes the UE procedure for determining the subset of resources to be reported to the higher layer in PSSCH resource selection in sidelink resource allocation mode 2.

In resource allocation mode 2, the higher layer may request the UE to determine a subset of resources from which the higher layer will select resources for PSSCH/PSCCH transmission. To trigger this procedure, in slot n, the higher layer shall provide the following parameters for the PSSCH/PSCCH transmission.

The resource pool to which the resource will be reported;

L1 priority, $prio_{TX}$;

Remaining packet delay budget (PDB);

Number of subchannels to be used for PSSCH/PSCCH transmission within the slot, $L_{subCH}$;

Optionally, the resource reservation interval in msec $P_{rsvpTX}$

If the higher layer requests the UE to determine a subset of resources to select for PSSCH/PSCCH transmission as part of a re-evaluation or pre-emption procedure, the higher layer shall provide a set of resources $(r_0, r_1, r_2, \ldots)$ that may be subject to re-evaluation and a set of resources $(r'_0, r'_1, r'_2, \ldots)$ that may be subject to pre-emption.

It is up to the UE implementation to determine the subset of resources requested by the upper layer before or after slot $(r_i''-T_3)$. Where $r_i''$ is the slot with the smallest slot index among $(r_0, r_1, r_2, \ldots)$ and $(r'_0, r'_1, r'_2, \ldots)$, and $T_3$ is equal to $T^{SL}_{proc,1}$. where $T^{SL}_{proc,1}$ is defined as the number of slots determined based on the SCS configuration of the SL BWP, and $\mu_{SL}$ is the SCS configuration of the SL BWP.

The following higher layer parameters affect this procedure sl-SelectionWindowList: The internal parameter $T_{2min}$ is set to the corresponding value from the upper-layer parameter sl-SelectionWindowList for a given value of $prio_{TX}$.

sl-Thres-RSRP-List: This higher layer parameter provides the RSRP threshold for each (pi, pi) combination. Where pi is the value of the priority field contained in the received SCI format 1-A and $p_j$ is the priority of the transmission on the resource selected by the UE; in this procedure, $p_j = prio_{TX}$.

sl-RS-ForSensing selects whether the UE uses PSSCH-RSRP or PSCCH-RSRP measurements.

sl-ResourceReservePeriodList sl-SensingWindow: The internal parameter $T_0$ is defined as the number of slots corresponding to sl-SensingWindow msec.

sl-TxPercentageList: The internal parameter X for a given $prio_{TX}$ is defined as sl-TxPercentageList($prio_{TX}$) converted from percentage to ratio.

sl-PreemptionEnable: If sl-PreemptionEnable is provided and is not equal to 'enabled', the internal parameter $prio_{pre}$ is set to the parameter sl-PreemptionEnable provided by the upper layer.

If a resource reservation interval $P_{rsvp\_TX}$ is provided, the resource reservation interval is converted from msec units to logical slot units $P'_{rsvp\_TX}$.

Notation:

$$(t_0'^{SL}, t_1'^{SL}, t_2'^{SL}, \ldots)$$

denotes the set of slots belonging to the sidelink resource pool.

For example, the UE may select a set ($S_A$) of candidate resources based on Table 16. For example, when resource (re)selection is triggered, the UE may select a set ($S_A$) of candidate resources based on Table 16. For example, if re-evaluation or pre-emption is triggered, the UE may select a set of candidate resources ($S_A$) based on Table 16.

TABLE 16

The following steps are used:

1) A candidate single-slot resource for transmission $R_{x,y}$ is defined as a set of $L_{subCH}$ contiguous sub-channels with sub-channel x + j in slot $t'^{SL}_y$ where j = 0, . . . , $L_{subCH} - 1$. The UE shall assume that any set of $L_{subCH}$ contiguous sub-channels included in the corresponding resource pool within the time interval [n + $T_1$, n + $T_2$] correspond to one candidate single-slot resource, where
   selection of $T_1$ is up to UE implementation under $0 \le T_1 \le T_{proc,1}^{SL}$, where $T_{proc,1}^{SL}$ is defined in slots in Table 8.1.4-2 where $\mu_{SL}$ is the SCS configuration of the SL BWP;
   if $T_{2min}$ is shorter than the remaining packet delay budget (in slots) then $T_2$ is up to UE implementation subject to $T_{2min} \le T_2 \le$ remaining packet delay budget (in slots); otherwise $T_2$ is set to the remaining packet delay budget (in slots).
   The total number of candidate single-slot resources is denoted by $M_{total}$.

2) The sensing window is defined by the range of slots [n − $T_0$, n-$T_{proc,0}^{SL}$) where $T_0$ is defined above and $T_{proc,0}^{SL}$ is defined in slots in Table 8.1.4-1 where $\eta_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots, 3) The internal parameter Th($p_i$, $p_j$) is set to the corresponding value of RSRP threshold indicated by the i-th field in sl-Thres-RSRP-List, where $i = p_i + (p_j - 1) * 8$.

4) The set $S_A$ is initialized to the set of all the candidate single-slot resources.

5) The UE shall exclude any candidate single-slot resource $R_{x,y}$ from the set $S_A$ if it meets all the following conditions:
   the UE has not monitored slot $t'^{SL}_m$ in Step 2.
   for any periodicity value allowed by the higher layer parameter sl-ResourceReservePeriodList and a hypothetical SCI format 1-A received in slot $t'^{SL}_m$ with 'Resource reservation period' field set to that periodicity value and indicating all subchannels of the resource pool in this slot, condition c in step 6 would be met.

5a) If the number of candidate single-slot resources $R_{x,y}$ remaining in the set $S_A$ is smaller than X · $M_{total}$, the set $S_A$ is initialized to the set of all the candidate single-slot resources as in step 4.

6) The UE shall exclude any candidate single-slot resource $R_{x,y}$ from the set $S_A$ if it meets all the following conditions:
   a) the UE receives an SCI format 1-A in slot $t'^{SL}_m$, and 'Resource reservation period' field, if present, and 'Priority' field in the received SCI format 1-A indicate the values $P_{rsvp\_RX}$ and $prio_{RX}$, respectively;
   b) the RSRP measurement performed, for the received SCI format 1-A, is higher than Th($prio_{RX}$, $prio_{TX}$);
   c) the SCI format received in slot $t'^{SL}_m$ or the same SCI format which, if and only if the 'Resource reservation period' field is present in the received SCI format 1-A, is assumed to be received in slot(s) $t'^{SL}_{m+q\times P'_{rsvp\_RX}}$ determines the set of resource blocks and slots which overlaps with $R_{x,y+j\times P'_{rsvp\_TX}}$ for q = 1, 2, . . . , Q and j = 0, 1, . . . , $C_{reset} - 1$. Here, $P'_{rsvp\_RX}$ is $P_{rsvp\_RX}$ converted to units of logical slots, $Q = \left\lceil \frac{T_{scal}}{P_{rsvp\_RX}} \right\rceil$ if $P_{rsvp\_RX} < T_{scal}$ and $n' - m \le P'_{rsvp\_RX}$, where $t'^{SL}_{n'} = n$ if slot n belongs to the set ($t'^{SL}_0$, $t'^{SL}_1$, . . . , $t'^{SL}_{T_{max}-1}$), otherwise slot $t'^{SL}_{n'}$ is the first slot after slot n belonging to the set ($t'^{SL}_0$, $t'^{SL}_1$, . . . , $t'^{SL}_{T_{max}-1}$); otherwise Q = 1. $T_{scal}$ is set to selection window size $T_2$ converted to units of msec.

7) If the number of candidate single-slot resources remaining in the set $S_A$ is smaller than X · $M_{total}$, then Th($p_i$, $p_j$) is increased by 3 dB for each priority value Th($p_i$, $p_j$) and the procedure continues with step 4.

The UE shall report set $S_A$ to higher layers.

If a resource $r_i$ from the set ($r_0$, $r_1$, $r_2$, . . . ) is not a member of $S_A$, then the UE shall report re-evaluation of the resource $r_i$ to higher layers.

TABLE 16-continued

| |
|---|
| If a resource $r'_i$ from the set ($r'_0$, $r'_1$, $r'_2$, . . . ) meets the conditions below then the UE shall report pre-emption of the resource $r'_i$ to higher layers.<br>$r'_i$ is not a member of $S_A$, and<br>$r'_i$ meets the conditions for exclusion in step 6, with Th($prio_{RX}$, $prio_{TX}$) set to the final threshold after executing steps 1)-7), i.e. including all necessary increments for reaching $X \cdot M_{total}$, and the associated priority $prio_{RX}$, satisfies one of the following conditions:<br>sl-PreemptionEnable is provided and is equal to 'enabled' and $prio_{TX} > prio_{RX}$<br>sl-PreemptionEnable is provided and is not equal to 'enabled', and $prio_{RX} < prio_{pre}$ and $prio_{TX} > prio_{RX}$ |

Meanwhile, a method of setting a switching gap for the SL positioning operation needs to be defined.

According to an embodiment of the present disclosure, an efficient switching gap setting method for SL positioning and an apparatus supporting the same are proposed.

In this disclosure, the following terms may be used

UE-triggered SL positioning: sidelink (SL) positioning where the procedure is triggered by the UE Base station/LMF-triggered SL positioning: SL positioning where the procedure is triggered by the base station/LMF UE-controlled SL positioning: SL positioning where the SL positioning group is generated by the UE Base station-controlled SL positioning: SL positioning where the SL positioning group is generated by the base station UE-based SL positioning: SL positioning where the UE position is calculated by the UE UE-assisted SL positioning: SL positioning where the UE position is calculated by the base station/LMF SL positioning group: UEs participating in SL positioning Target UE (T-UE): UE whose position is calculated Server UE (S-UE): UE that assists T-UE's SL positioning MG: measurement gap where only SL PRS transmission is allowed MW: measurement window where both SL data and SL PRS can be transmitted in a multiplexed way For example, an SL PRS transmission resource may consist of an SL PRS resource set consisting of the following information SL PRS resource set ID SL PRS resource ID list: a list of SL PRS resource IDs within the SL PRS resource set SL PRS resource type: May be set to periodic, aperiodic, semi-persistent, or on-demand Alpha for SL PRS power control $P_0$ for SL PRS power control Path loss reference for SL PRS power control: May be set to SL SSB or DL PRS or UL SRS or UL SRS for positioning or PSCCH DMRS or PSSCH DMRS or PSFCH or SL CSI RS, etc For example, the set of SL PRS resources may comprise a SL PRS resource comprising the following information.

SL PRS resource ID

SL PRS comb size: Interval between REs in which SL PRS are transmitted within a symbol SL PRS comb offset: RE index where SL PRS is first transmitted in the first SL PRS symbol SL PRS comb cyclic shift: Cyclic shift used to generate a sequence constituting the SL PRS SL PRS start position: Index of the first symbol to transmit SL PRS in one slot Number of SL PRS symbols: The number of symbols constituting SL PRS in one slot Frequency domain shift: The lowest frequency position (index) where SL PRS is transmitted in the frequency domain SL PRS BW: Frequency bandwidth used for SL PRS transmission SL PRS resource type: May be set to periodic or aperiodic, semi-persistent or on-demand SL PRS periodicity: Period in the time domain between SL PRS resources, or unit of logical slot in resource pool where physical or SL PRS is transmitted SL PRS offset: offset in the time domain from the reference timing to the start of the first SL PRS resource, unit of a logical slot in a resource pool in which a physical or SL PRS is transmitted. The reference timing may be SFN=0 or DFN=0 or the time of successful reception or decoding of the RRC/MAC-CE/DCI/SCI associated with the SL PRS resource.

SL PRS Sequence ID

SL PRS spatial relation: May be set to SL SSB or DL PRS or UL SRS or UL SRS for positioning or PSCCH DMRS or PSSCH DMRS or PSFCH or SL CSI RS, etc.

SL PRS CCH: SL PRS control channel (CCH). Can signal SL PRS resource configuration information, resource location, etc.

Meanwhile, when performing SL RTT positioning, if a UE A transmits a first SL positioning reference signal (PRS) to a UE B, the UE B may perform an operation of transmitting a second SL PRS to the UE A after receiving the first SL PRS.

In one embodiment, in the case described above, where the first SL PRS and the second SL PRS are transmitted in the same SL slot, a transmission/reception (TX/RX) switching gap may be located between the first SL PRS resource and the second SL PRS resource. For example, the transmission/reception (TX/RX) switching gap may comprise at least one symbol.

In one embodiment, since the first SL PRS symbol comprising the second SL PRS is transmitted in the form of a waveform that is repeated identically as much as a SL PRS comb size in the time domain based on the SL PRS resource configuration information, a portion of the repeated waveform may be used as the transmission/reception (TX/RX) switching gap located between the first SL PRS resource and the second SL PRS resource, and the remainder of repeated waveform, excluding the portion, may be used as the second SL PRS.

For example, the number of the repeated waveforms from the start of the first SL PRS symbol to be used as the transmission/reception (TX/RX) switching gap may be (pre) configured in the resource pool. For example, the number of the repeated waveforms to be used as the transmission/reception (TX/RX) switching gap may be determined based on the subcarrier spacing configured in the resource pool in which the SL PRS is transmitted.

In one embodiment, in the case described above, when the first SL PRS and the second SL PRS are transmitted in the same SL slot, the position of the transmission/reception (TX/RX) switching gap symbol may be determined based on a SL PRS comb size or the number of symbols constituting the SL PRS (SL PRS # of symbols) corresponding to the first SL PRS resource configuration information. For example, an index of the transmission/reception (TX/RX) switching gap symbol may be determined as a value that is one greater than an index of the last SL PRS symbol comprising the first SL PRS.

In one embodiment, in the case described above, when N first SL PRS resources are aggregated and transmitted in one SL slot, the position of the transmission/reception (TX/RX) switching gap symbol may be determined based on the sum of the SL PRS comb size or the number of symbols constituting the SL PRS (SL PRS # of symbols) corresponding to the N first SL PRS resource configuration information. For example, an index of the transmission/reception (TX/RX) switching gap symbol may be determined to be one greater than an index of the last SL PRS symbol comprising the aggregated N SL PRS resources. For example, the maximum value of N that may be transmitted aggregated in one SL slot may be (pre)configured in the resource pool.

In one embodiment, in the case described above, the position of the transmission/reception (TX/RX) switching gap symbol may be (pre)configured in the resource pool. For example, the position of the transmission/reception (TX/RX) switching gap symbol may be indicated through a SL PRS control channel (CCH) related to the first SL PRS.

In one embodiment, when the position of the transmission/reception (TX/RX) switching gap symbol is configured to be fixed within the SL slot, if the sum of the number of symbols constituting one or more first SL PRS resources is less than or equal to the number of symbols (excluding automatic gain control (AGC) gap symbols) preceding the transmission/reception (TX/RX) switching gap symbol in the SL slot, the one or more first SL PRS resources may be aggregated and transmitted before the transmission/reception (TX/RX) switching gap symbols.

In one embodiment, in SL positioning, when a SL PRS resource transmitted by a UE A to a UE B and a channel for transmitting the result of measurement based on the SL PRS received by the UE B to the UE A or a SL PRS ACK/NACK resource transmitted by the UE B to the UE A to indicate successful reception of the SL PRS or to request retransmission of the SL PRS are located in one SL slot, a transmission/reception (TX/RX) switching gap (consisting of at least one symbol) may be located between the SL PRS resource and the channel reporting the measurement results or the SL PRS ACK/NACK resource.

In one embodiment, in the case described above, the position of the transmission/reception (TX/RX) switching gap symbol may be determined based on a SL PRS comb size or the number of symbols constituting the SL PRS (SL PRS # of symbols) corresponding to the SL PRS resource configuration information. For example, an index of the transmission/reception (TX/RX) switching gap symbol may be determined as a value that is one greater than an index of the last SL PRS symbol comprising the SL PRS.

In one embodiment, in the case described above, when N SL PRS resources are aggregated and transmitted in one SL slot, the position of the transmission/reception (TX/RX) switching gap symbol may be determined based on the sum of the SL PRS comb size or the number of symbols constituting the SL PRS (SL PRS # of symbols) based on the configuration information of the N SL PRS resources. For example, an index of the transmission/reception (TX/RX) switching gap symbol may be determined to be one greater than an index of the last SL PRS symbol comprising the aggregated N SL PRS resources. For example, the maximum value of N that may be transmitted aggregated in one SL slot may be (pre)configured in the resource pool.

In one embodiment, in the case described above, the position of the transmission/reception (TX/RX) switching gap symbols may be (pre)configured in the resource pool. For example, the position of the transmission/reception (TX/RX) switching gap symbol may be indicated through a SL PRS control channel (CCH) related to the first SL PRS.

In one embodiment, when the position of the transmission/reception (TX/RX) switching gap symbol is configured to be fixed within the SL slot, if the sum of the number of symbols constituting one or more first SL PRS resources is less than or equal to the number of symbols (excluding automatic gain control (AGC) gap symbols) preceding the transmission/reception (TX/RX) switching gap symbol in the SL slot, the one or more first SL PRS resources may be aggregated and transmitted before the transmission/reception (TX/RX) switching gap symbol.

In one embodiment, when transmitting a SL PRS in a SL slot for SL positioning, since a first SL PRS symbol constituting the SL PRS is transmitted in the form of a waveform identically repeated as much as the SL PRS comb size in the time domain based on the SL PRS resource configuration information, a portion of the repeated waveform may be used as an automatic gain control (AGC) gap related to the SL slot through which the SL PRS is transmitted, and the remainder of repeated waveform, excluding the portion, may be used as the first SL PRS. For example, the number of the repeated waveforms from the start of the first SL PRS symbol to be used as the automatic gain control (AGC) gap may be (pre)configured in the resource pool. For example, the number of the repeated waveforms to be used as the automatic gain control (AGC) gap may be determined based on the subcarrier spacing configured in the resource pool in which the SL PRS is transmitted.

Figure 14:
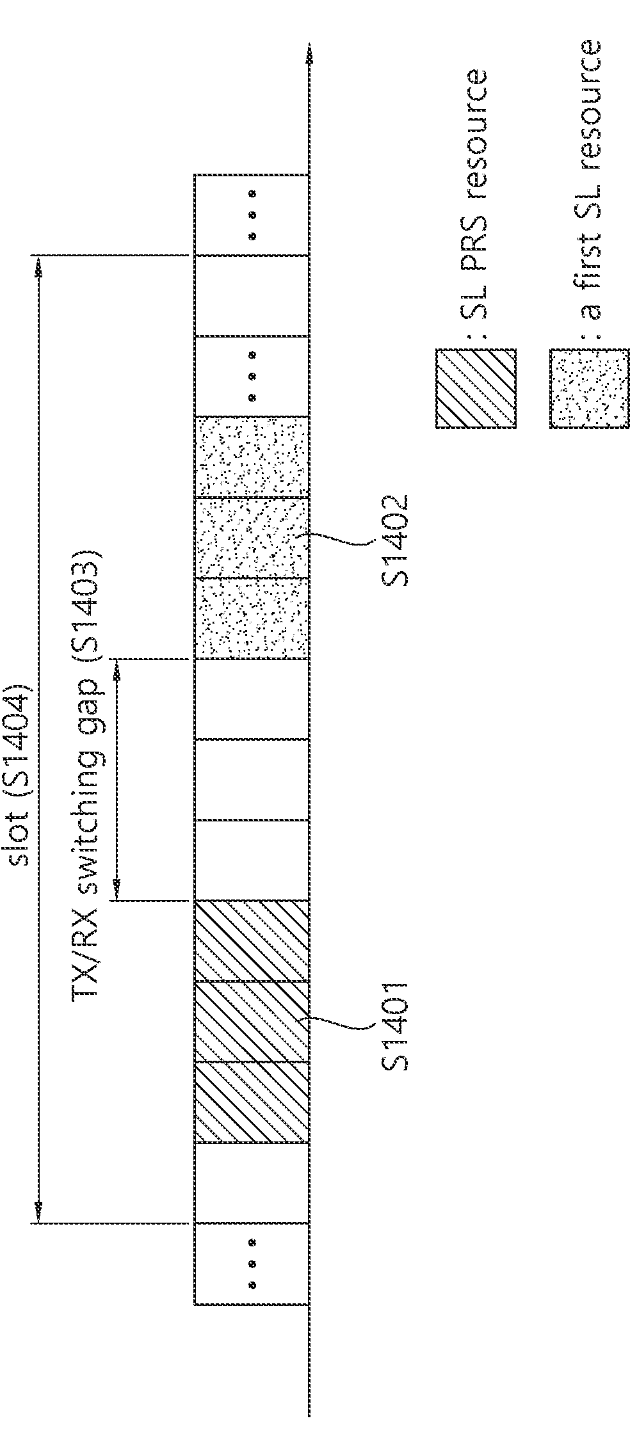
FIG. 14 shows an operation for determining a location of a transmission/reception (TX/RX) switching gap, based on an embodiment of the present disclosure.

FIG. 14 shows an operation for determining a location of a transmission/reception (TX/RX) switching gap, based on an embodiment of the present disclosure. The embodiment of FIG. 14 may be combined with various embodiments of the present disclosure.

Referring to FIG. 14, A first SL PRS may be transmitted on a SL PRS resource 1401. For example, a second SL PRS or a positioning result based on the first SL PRS or an ACK/NACK signal for the first SL PRS may be transmitted on the first SL resource 1402. For example, a transmission/reception (TX/RX) switching gap may be located between the SL PRS resource and the first SL PRS resource 1403. For example, the SL PRS resource and the first SL PRS resource may be contained within the same slot 1404.

Figure 15:
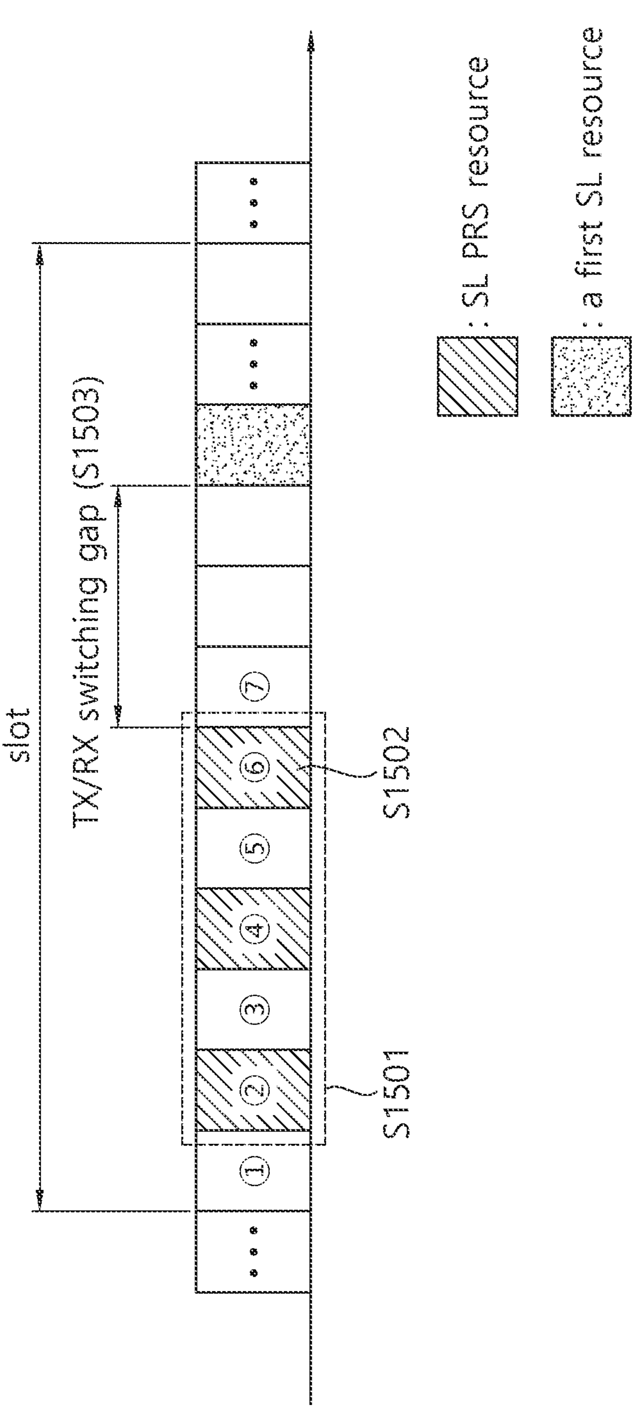
FIG. 15 shows an operation for determining a location of a transmission/reception (TX/RX) switching gap when SL PRS resources are aggregated and transmitted, based on an embodiment of the present disclosure.

FIG. 15 shows an operation for determining a location of a transmission/reception (TX/RX) switching gap when SL PRS resources are aggregated and transmitted, based on an embodiment of the present disclosure. The embodiment of FIG. 15 may be combined with various embodiments of the present disclosure.

Referring to FIG. 15, A first SL PRS may be transmitted by being aggregated N SL PRS resources 1501. For example, an index 1503 of the symbol where the transmission/reception (TX/RX) switching gap starts may be one greater than an index 1502 of the last SL PRS symbol comprising the aggregated N SL PRS resources.

In the embodiment(s) of the present disclosure, a method for sensing and selecting a resource based on a beam in case of SL positioning using beamforming and an apparatus supporting the same are proposed.

For example, when performing SL positioning using beamforming, a UE A may send a request to its neighboring UEs to join a SL positioning group performing SL positioning, and the neighboring UEs may accept the request to join the SL positioning group. For example, in the process of the neighboring UEs joining the SL positioning group, the UE A may finally approve the participation of the neighboring UEs in the SL positioning group when the Reference Signal Received Power (RSRP) related to the signal or channel indicating acceptance by the neighboring UEs for the participation request sent through a beamforming resource having an arbitrary beam index is greater than or equal to a specific threshold value. By doing this, the UE A may secure the performance of the SL positioning to a certain level or higher.

For example, if one or more neighboring UEs indicate acceptance of a join request sent through a beamforming resource having the beam index, the UE A may join only one neighboring UE in the SL positioning group in the direction of the beam index. For example, the one neighboring UE may be a neighboring UE with the highest RSRP, based on the RSRP related to a signal or channel that the neighboring UEs indicates acceptance. By doing this, it is possible to prevent a problem of deteriorating SL positioning performance due to one or more UEs participating in positioning in the same beam index direction. For example, this can prevent degradation of SL positioning performance when performing SL Time Difference of Arrival (TDOA).

For example, as described above, after determining one neighboring UE participating in SL positioning group for each beam index, the UE A may, based on the RSRP measurements related to the acceptance signal or channel related to each of the neighboring UEs, get a certain threshold number or more of the neighboring UEs to participate in the final SL positioning group in the order of having the highest RSRP measurements.

For example, when a UE A performs SL positioning based on beamforming, the UE A may, after determining a candidate SL PRS transmission resource based on the sensing result for each beam index direction for the resource in the resource pool, finally get neighboring UEs that have accepted the request to join a SL positioning group to join the SL positioning group, in the direction of a beam index that satisfies a (pre)configured target number of percentage of resources for the beam index.

For example, when a UE A performs SL positioning based on beamforming, the UE A may, after determining a candidate SL PRS transmission resource based on the sensing results for each beam index direction for the resources in the resource pool, finally get neighboring UEs that have accepted the request to join a SL positioning group to join the SL positioning group, in the direction of a certain (pre)configured threshold number of beam indexes or more, in the order of the lowest final RSRP threshold used to determine the candidate SL PRS transmission resource.

For example, when a UE A performs SL positioning based on beamforming, the UE A may, after determining a candidate SL PRS transmission resource based on the sensing results for each beam index direction for the resources in the resource pool, finally get neighboring UEs that have accepted the request to join a SL positioning group to join the SL positioning group, in the direction of a beam index where the final RSRP threshold used to determine the candidate SL PRS transmission resource is less than or equal to the certain threshold.

In one embodiment, when a UE performs SL positioning based on beamforming, the UE may determine a SL PRS transmission resource based on sensing. For example, when the UE determines the SL PRS transmission resource based on the sensing, the UE may determine the length of a sensing window for the sensing operation based on an operation period for performing beam tracking in the beamforming operation. For example, the length of the sensing window may be selected to be less than or equal to the beam tracking period. By doing so, said terminal may reduce power consumption by utilizing the characteristic that sensing results do not vary significantly within said beam tracking period. By doing this, the UE can reduce power consumption by utilizing the characteristic that sensing result does not significantly change within the beam tracking period.

In the case described above, for example, for power saving of a UE, the UE may select a SL PRS transmission resource based on sensing for each beam tracking period. In the case described above, for example, as a result of re-evaluation of the reserved transmission resource selected based on the sensing of an arbitrary beam index, if the number of collisions of the previously reserved transmission resource is greater than or equal to a certain threshold, the UE may determine that the channel in the beam index direction changes faster than before, and may decrease the beam tracking period from a previously used period. In the case described above, for example, the UE may reduce the length of the sensing window for sensing the beam index from a previously used length.

In the case described above, for example, as a result of re-evaluation of the reserved transmission resource selected based on the sensing of an arbitrary beam index, if the number of collisions of the previously reserved transmission resource is less than a certain threshold, the UE may determine that the channel in the beam index direction changes more slowly than before, and may increase the beam tracking period from a previously used period. In the case described above, for example, the UE may increase the length of the sensing window for sensing the beam index from the length previously used.

In the case described above, for example, beam tracking period and the length of the sensing window for a beam index may be independently determined for each beam index related to the beamforming used by the UE.

For example, whether the rule is applied and/or the parameter value related to the proposed method/rule may be configured/allowed specifically (or differently or independently) for a service type. For example, whether the rule is applied and/or the parameter value related to the proposed method/rule may be configured/allowed specifically (or differently or independently) for a (LCH or service) priority. For example, whether the rule is applied and/or the parameter value related to the proposed method/rule may be configured/allowed specifically (or differently or independently) for a QoS requirement (e.g., latency, reliability, minimum communication range). For example, whether the rule is applied and/or the parameter value related to the proposed method/rule may be configured/allowed specifically (or differently or independently) for a PQI parameter. For example, whether the rule is applied and/or the parameter value related to the proposed method/rule may be configured/allowed specifically (or differently or independently) for SL HARQ feedback enabled LCH/MAC PDU (transmission). For example, whether the rule is applied and/or the parameter value related to the proposed method/rule may be configured/allowed specifically (or differently or independently) for SL HARQ feedback disabled LCH/

MAC PDU (transmission). For example, whether the rule is applied and/or the parameter value related to the proposed method/rule may be configured/allowed specifically (or differently or independently) for a CBR measurement value of a resource pool. For example, whether the rule is applied and/or the parameter value related to the proposed method/rule may be configured/allowed specifically (or differently or independently) for a SL cast type (e.g., unicast, groupcast, broadcast). For example, whether the rule is applied and/or the parameter value related to the proposed method/rule may be configured/allowed specifically (or differently or independently) for a SL groupcast HARQ feedback option (e.g., NACK only feedback, ACK/NACK feedback, NACK only feedback based on TX-RX distance). For example, whether the rule is applied and/or the parameter value related to the proposed method/rule may be configured/allowed specifically (or differently or independently) for a SL mode 1 CG type (e.g., SL CG type 1 or SL CG type 2). For example, whether the rule is applied and/or the parameter value related to the proposed method/rule may be configured/allowed specifically (or differently or independently) for a SL mode type (e.g., mode 1 or mode 2). For example, whether the rule is applied and/or the parameter value related to the proposed method/rule may be configured/allowed specifically (or differently or independently) for a resource pool. For example, whether the rule is applied and/or the parameter value related to the proposed method/rule may be configured/allowed specifically (or differently or independently) for whether a PSFCH resource is configured in a resource pool. For example, whether the rule is applied and/or the parameter value related to the proposed method/rule may be configured/allowed specifically (or differently or independently) for a source (L2) ID. For example, whether the rule is applied and/or the parameter value related to the proposed method/rule may be configured/allowed specifically (or differently or independently) for a destination (L2) ID. For example, whether the rule is applied and/or the parameter value related to the proposed method/rule may be configured/allowed specifically (or differently or independently) for a PC5 RRC connection link. For example, whether the rule is applied and/or the parameter value related to the proposed method/rule may be configured/allowed specifically (or differently or independently) for a SL link. For example, whether the rule is applied and/or the parameter value related to the proposed method/rule may be configured/allowed specifically (or differently or independently) for a connection state (with a base station)(e.g., RRC CONNECTED state, IDLE state, INACTIVE state). For example, whether the rule is applied and/or the parameter value related to the proposed method/rule may be configured/allowed specifically (or differently or independently) for a SL HARQ process (ID). For example, whether the rule is applied and/or the parameter value related to the proposed method/rule may be configured/allowed specifically (or differently or independently) for whether to perform SL DRX operation (of TX UE or RX UE). For example, whether the rule is applied and/or the parameter value related to the proposed method/rule may be configured/allowed specifically (or differently or independently) for whether a UE is a power saving (TX or RX) UE. For example, whether the rule is applied and/or the parameter value related to the proposed method/rule may be configured/allowed specifically (or differently or independently) for a case in which PSFCH TX and PSFCH RX (and/or a plurality of PSFCH TXs (exceeding UE capability)) overlap (and/or a case in which PSFCH TX (and/or PSFCH RX) is skipped)(from a specific UE perspective). For example, whether the rule is applied and/or the parameter value related to the proposed method/rule may be configured/allowed specifically (or differently or independently) for a case in which the RX UE actually (successfully) receives PSCCH (and/or PSSCH) (re)transmission from the TX UE.

For example, in the present disclosure, the term "configured/configuration (or designated/designation)" can be extended/interpreted to/as that the base station informs the UE through a pre-defined (physical layer or higher layer) channel/signal (e.g., SIB, RRC, MAC CE) (and/or being provided through pre-configuration and/or that the UE informs other UEs through a pre-defined (physical layer or higher layer) channel/signal (e.g., SL MAC CE, PC5 RRC)).

For example, in the present disclosure, the term "PSFCH" can be extended/interpreted to/as (NR or LTE) PSSCH (and/or (NR or LTE) PSCCH) (and/or (NR or LTE) SL SSB (and/or UL channel/signal)). In addition, the proposed methods of the present disclosure can be used in combination with each other (as a new type of manner).

For example, in the present disclosure, the specific threshold may refer to a threshold pre-defined or (pre-)configured by a higher layer (including an application layer) of the network, the base station, or the UE. For example, in the present disclosure, the specific configured value may refer to a value pre-defined or (pre-)configured by a higher layer (including an application layer) of the network, the base station, or the UE. For example, the operation configured by the network/base station may refer to that the base station (pre-)configures to the UE through higher layer RRC signaling or the base station configures/signals to the UE through MAC CE or the base station signals to the UE through DCI.

According to various embodiments of the present disclosure, a switching gap can be efficiently set between SL PRS transmission and measurement result transmission, or between a first and second SL PRS at SL RTT, for SL positioning operations.

Figure 16:
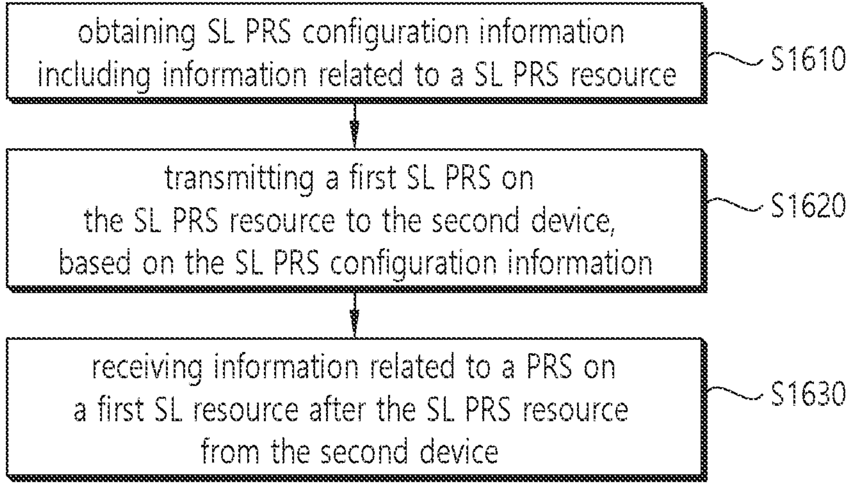
FIG. 16 shows a method for performing wireless communication by a first device, based on an embodiment of the present disclosure.

FIG. 16 shows a method for performing wireless communication by a first device, based on an embodiment of the present disclosure. The embodiment of FIG. 16 may be combined with various embodiments of the present disclosure.

Referring to FIG. 16, In step S1610, a first device may obtain sidelink (SL) Positioning Reference Signal (PRS) configuration information including information related to a SL PRS resource. In step S1620, the first device may transmit a first SL PRS on the SL PRS resource to the second device, based on the SL PRS configuration information. In step S1630, the first device may receive information related to a PRS on a first SL resource after the SL PRS resource from the second device. For example, a switching gap for receiving the information related to the PRS is determined based on the SL PRS resource and the first SL resource.

For example, the switching gap is determined between the SL PRS resource and the first SL resource.

For example, the SL PRS resource and the first SL resource is included in a same slot.

For example, the information related to the PRS includes a second SL PRS and the second SL PRS is transmitted on the first SL resource. For example, based on the second SL PRS being transmitted in a repeating waveform based on a comb size, a portion of the waveform is used as the switching gap.

For example, a position of the switching gap is determined, based on the SL PRS configuration information including information related to a SL PRS comb size and information related to the number of symbols included in the SL PRS resource.

For example, an index of a start symbol of the switching gap is greater than an index of a last symbol of the SL PRS resource by 1.

For example, based on that the SL PRS resource is an aggregated resource of N SL PRS resources, an index of a start symbol of the switching gap is greater than an index of a last symbol included in the aggregated resource by 1, and the N is a positive integer. For example, a maximum value of the N is configured in a resource pool or pre-configured.

For example, a start time and an end time of the switching gap are configured through a SL PRS control channel (CCH) related to the first SL PRS.

For example, the information related to the PRS includes a positioning result based on the first SL PRS, and the positioning result based on the first SL PRS is transmitted on the first SL resource.

For example, the information related to the PRS includes an acknowledgement (ACK) signal indicating a success in transmission of the first SL PRS or a negative acknowledgement (NACK) signal indicating a fail in transmission of the first SL PRS, and the ACK signal or the NACK signal being transmitted on the first SL resource.

For example, based on the second SL PRS being transmitted in a repeating waveform based on a comb size, a portion of the waveform is used for an Automatic Gain Control (AGC).

The proposed method may be applied to devices according to various embodiments of the present disclosure. First, a processor 102 of a first device 100 may control a transceiver 106 to obtain sidelink (SL) Positioning Reference Signal (PRS) configuration information including information related to a SL PRS resource. And, the processor 102 of the first device 100 may control a transceiver 106 to transmit a first SL PRS on the SL PRS resource to the second device, based on the SL PRS configuration information. And, the processor 102 of the first device 100 may control a transceiver 106 to receive information related to a PRS on a first SL resource after the SL PRS resource from the second device. For example, a switching gap for receiving the information related to the PRS is determined based on the SL PRS resource and the first SL resource.

According to one embodiment of the present disclosure, provided is a first device configured to perform wireless communication. The first device may comprise: at least one transceiver; at least one processor; and at least one memory connected to the at least one processor and storing instructions. For example, the instructions, based on being executed by the at least one processor, cause the first device to perform operations comprising: obtaining sidelink (SL) Positioning Reference Signal (PRS) configuration information including information related to a SL PRS resource; transmitting a first SL PRS on the SL PRS resource to the second device, based on the SL PRS configuration information; and receiving information related to a PRS on a first SL resource after the SL PRS resource from the second device. For example, a switching gap for receiving the information related to the PRS is determined based on the SL PRS resource and the first SL resource.

According to one embodiment of the present disclosure, provided is a processing device configured to control a first device. The processing device may comprise: at least one processor; and at least one memory connected to the at least one processor and storing instructions. For example, the instructions, based on being executed by the at least one processor, cause the first device to perform operations comprising: obtaining sidelink (SL) Positioning Reference Signal (PRS) configuration information including information related to a SL PRS resource; transmitting a first SL PRS on the SL PRS resource to the second device, based on the SL PRS configuration information; and receiving information related to a PRS on a first SL resource after the SL PRS resource from the second device. For example, a switching gap for receiving the information related to the PRS is determined based on the SL PRS resource and the first SL resource.

According to one embodiment of the present disclosure, provided is a non-transitory computer-readable storage medium recording instructions. For example, the instructions, based on being executed, cause a first device to perform operations comprising: obtaining sidelink (SL) Positioning Reference Signal (PRS) configuration information including information related to a SL PRS resource; transmitting a first SL PRS on the SL PRS resource to the second device, based on the SL PRS configuration information; and receiving information related to a PRS on a first SL resource after the SL PRS resource from the second device. For example, a switching gap for receiving the information related to the PRS is determined based on the SL PRS resource and the first SL resource.

Figure 17:
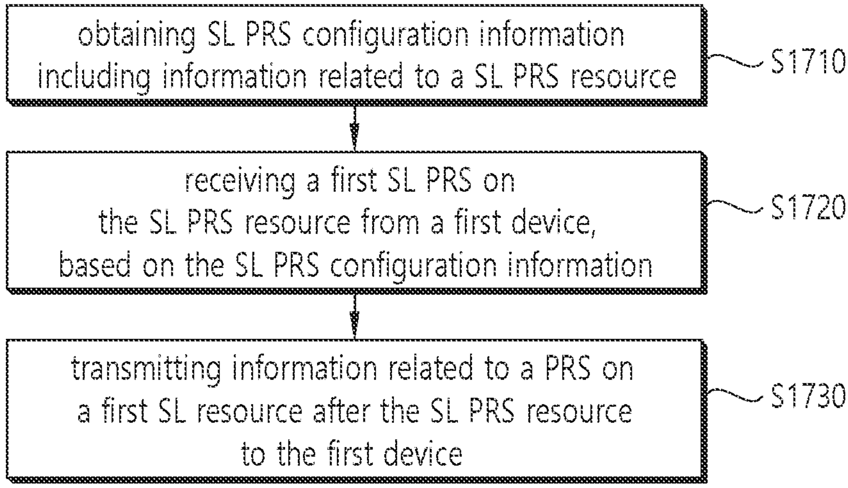
FIG. 17 shows a method for performing wireless communication by a second device, based on an embodiment of the present disclosure.

FIG. 17 shows a method for performing wireless communication by a second device, based on an embodiment of the present disclosure. The embodiment of FIG. 17 may be combined with various embodiments of the present disclosure.

Referring to FIG. 17, In step S1710, a second device may obtain sidelink (SL) Positioning Reference Signal (PRS) configuration information including information related to a SL PRS resource. In step S1720, the second device may receive a first SL PRS on the SL PRS resource from a first device, based on the SL PRS configuration information. In step S1730, the second device may transmit information related to a PRS on a first SL resource after the SL PRS resource to the first device. For example, a switching gap for transmitting the information related to the PRS is determined based on the SL PRS resource and the first SL resource.

The proposed method may be applied to devices according to various embodiments of the present disclosure. First, a processor 202 of a second device 200 may control a transceiver 206 to obtain sidelink (SL) Positioning Reference Signal (PRS) configuration information including information related to a SL PRS resource. And, the processor 202 of the second device 200 may control a transceiver 206 to receive a first SL PRS on the SL PRS resource from a first device, based on the SL PRS configuration information. And, the processor 202 of the second device 200 may control a transceiver 206 to transmit information related to a PRS on a first SL resource after the SL PRS resource to the first device. For example, a switching gap for transmitting the information related to the PRS is determined based on the SL PRS resource and the first SL resource.

According to one embodiment of the present disclosure, provided is a second device configured to perform wireless communication. The second device may comprise: at least one transceiver; at least one processor; and at least one memory connected to the at least one processor and storing instructions. For example, the instructions, based on being executed by the at least one processor, cause the second device to perform operations comprising: obtaining sidelink (SL) Positioning Reference Signal (PRS) configuration information including information related to a SL PRS resource; receiving a first SL PRS on the SL PRS resource from a first device, based on the SL PRS configuration information; and transmitting information related to a PRS on a first SL resource after the SL PRS resource to the first device. For example, a switching gap for transmitting the information related to the PRS is determined based on the SL PRS resource and the first SL resource.

According to one embodiment of the present disclosure, provided is a processing device configured to control a second device. The processing device may comprise: at least one processor; and at least one memory connected to the at least one processor and storing instructions. For example, the instructions, based on being executed by the at least one processor, cause the second device to perform operations comprising: obtaining sidelink (SL) Positioning Reference Signal (PRS) configuration information including information related to a SL PRS resource; receiving a first SL PRS on the SL PRS resource from a first device, based on the SL PRS configuration information; and transmitting information related to a PRS on a first SL resource after the SL PRS resource to the first device. For example, a switching gap for transmitting the information related to the PRS is determined based on the SL PRS resource and the first SL resource.

According to one embodiment of the present disclosure, provided is a non-transitory computer-readable storage medium recording instructions. For example, the instructions, based on being executed, cause a second device to perform operations comprising: obtaining sidelink (SL) Positioning Reference Signal (PRS) configuration information including information related to a SL PRS resource; receiving a first SL PRS on the SL PRS resource from a first device, based on the SL PRS configuration information; and transmitting information related to a PRS on a first SL resource after the SL PRS resource to the first device. For example, a switching gap for transmitting the information related to the PRS is determined based on the SL PRS resource and the first SL resource.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 18 shows a communication system 1, based on an embodiment of the present disclosure. The embodiment of FIG. 18 may be combined with various embodiments of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V) Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*. 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
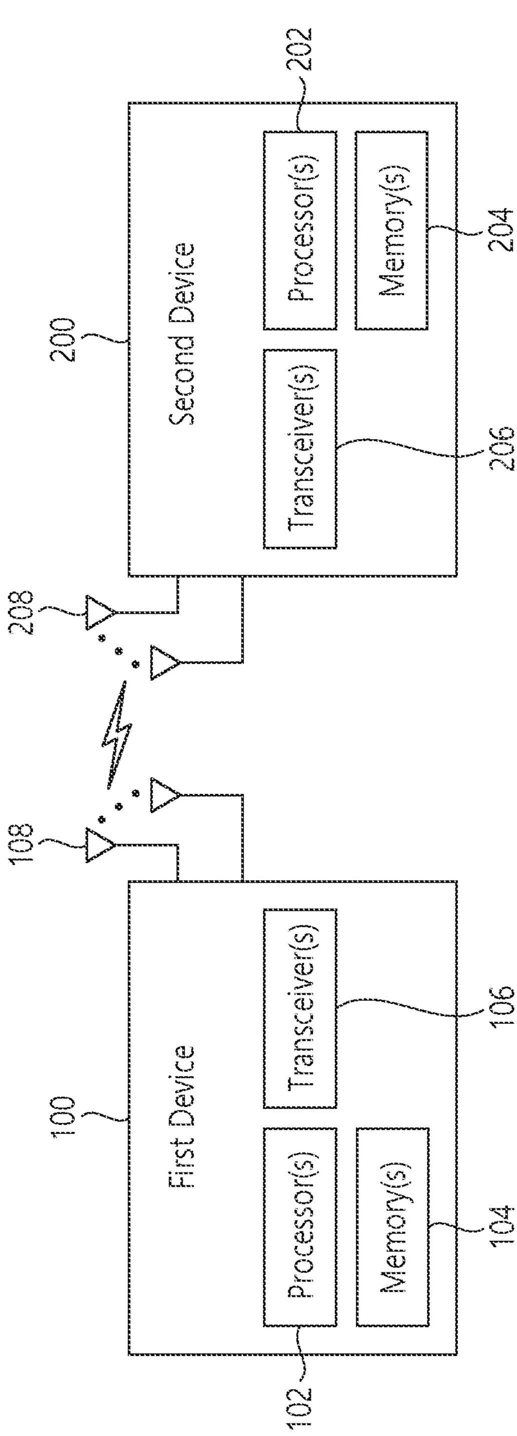
FIG. 19 shows wireless devices, based on an embodiment of the present disclosure.

FIG. 19 shows wireless devices, based on an embodiment of the present disclosure. The embodiment of FIG. 19 may be combined with various embodiments of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC. PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs). Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 20 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 20 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
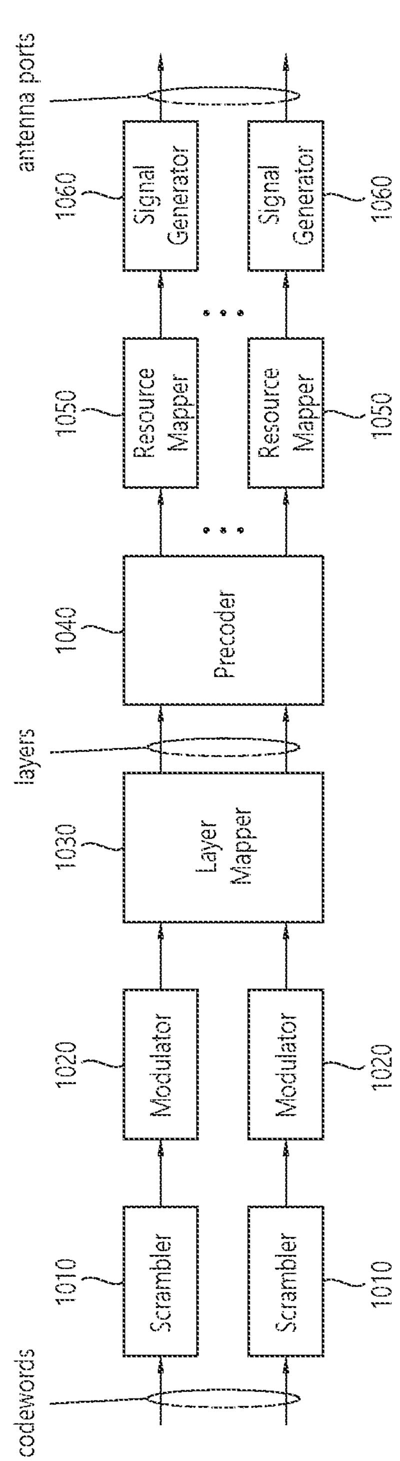
FIG. 20 shows a signal process circuit for a transmission signal, based on an embodiment of the present disclosure.

FIG. 20 shows a signal process circuit for a transmission signal, based on an embodiment of the present disclosure. The embodiment of FIG. 20 may be combined with various embodiments of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
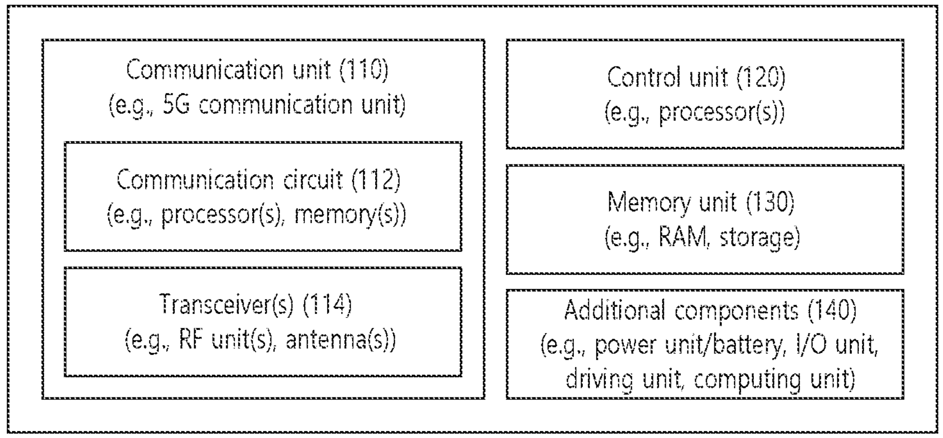
FIG. 21 shows another example of a wireless device, based on an embodiment of the present disclosure.

FIG. 21 shows another example of a wireless device, based on an embodiment of the present disclosure. The wireless device may be implemented in various forms according to a use-case/service (refer to FIG. 18). The embodiment of FIG. 21 may be combined with various embodiments of the present disclosure.

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 18), the vehicles (100*b*-1 and 100*b*-2 of FIG. 18), the XR device (100*c* of FIG. 18), the hand-held device (100*d* of FIG. 18), the home appliance (100*e* of FIG. 18), the IoT device (100*f* of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
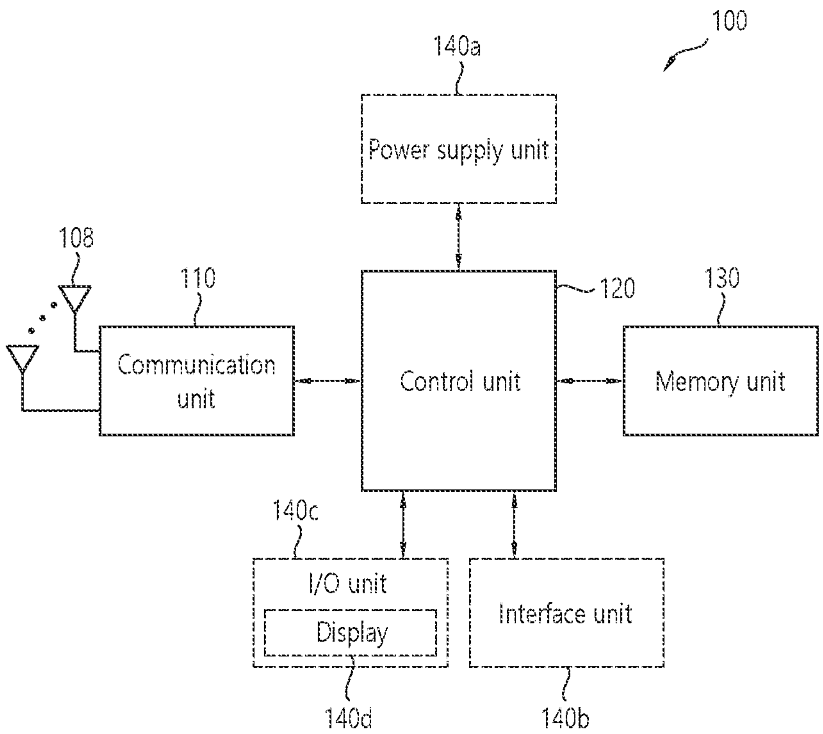
FIG. 22 shows a hand-held device, based on an embodiment of the present disclosure.

FIG. 22 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 22 may be combined with various embodiments of the present disclosure.

Referring to FIG. 22, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video U/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 23:
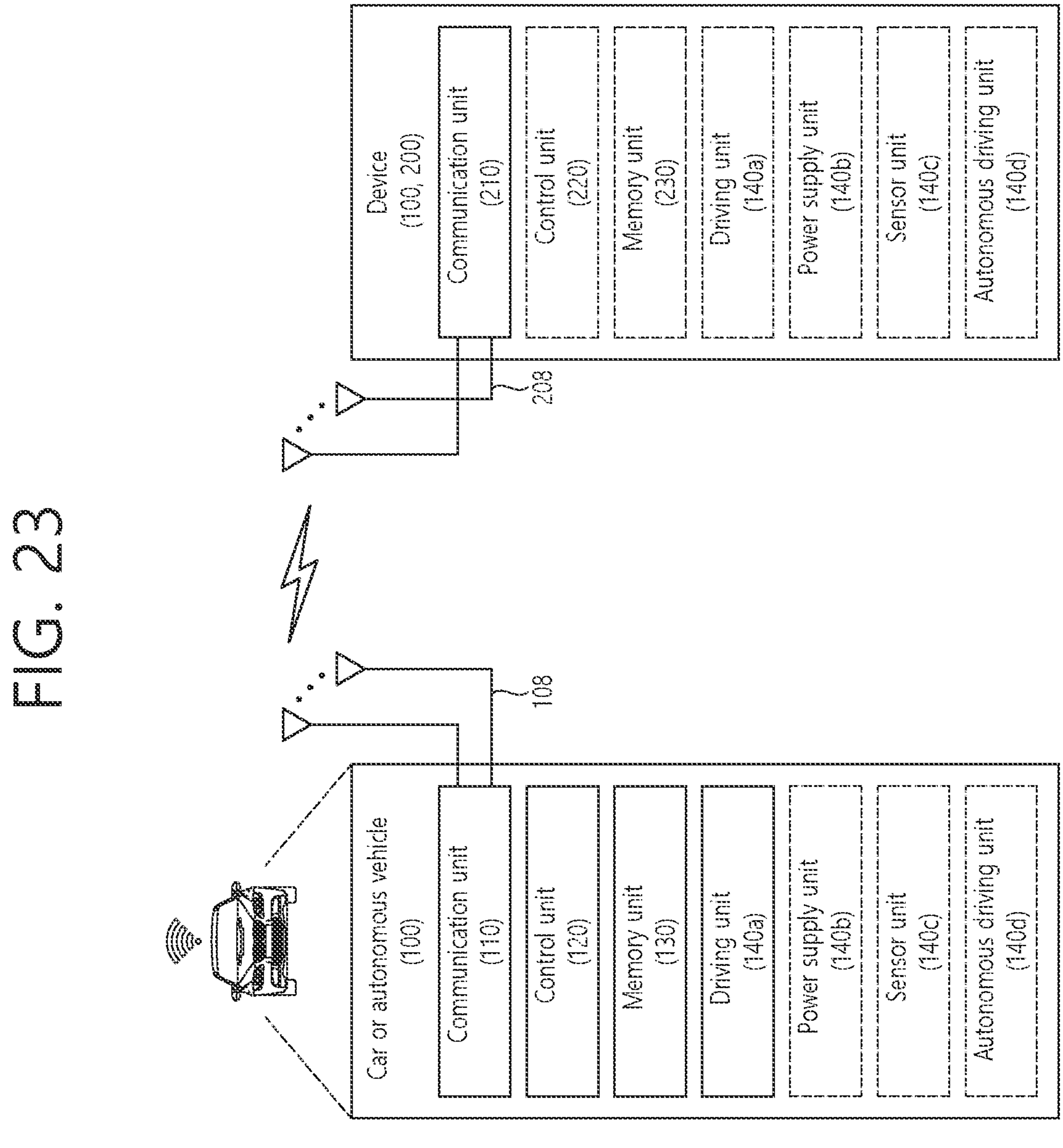
FIG. 23 shows a vehicle or an autonomous vehicle, based on an embodiment of the present disclosure.

FIG. 23 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 23 may be combined with various embodiments of the present disclosure.

Referring to FIG. 23, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:

obtaining, by a first device, sidelink (SL) Positioning Reference Signal (PRS) resource configuration, wherein the SL PRS resource configuration includes information related to a SL PRS comb size of a SL PRS resource and information related to a number of symbols included in the SL PRS resource;

transmitting, by the first device, to a second device, a first SL PRS on the SL PRS resource; and receiving, by the first device, from the second device, information related to a PRS on a first SL resource after the SL PRS resource, wherein a switching gap for receiving the information related to the PRS is determined, based on the information related to the SL PRS comb size of the SL PRS resource and the information related to the number of symbols included in the SL PRS resource.

2. The method of claim 1, wherein the switching gap is determined between the SL PRS resource and the first SL resource.

3. The method of claim 1, wherein the SL PRS resource and the first SL resource are included in a same slot.

4. The method of claim 1, wherein the information related to the PRS includes a second SL PRS and the second SL PRS is transmitted on the first SL resource.

5. The method of claim 4, wherein, based on the second SL PRS being transmitted in a repeating waveform based on the comb size, a portion of the waveform is used as the switching gap.

6. The method of claim 4, wherein, based on the second SL PRS being transmitted in a repeating waveform based on the comb size, a portion of the waveform is used for an Automatic Gain Control (AGC).

7. The method of claim 1, wherein an index of a start symbol of the switching gap is greater than an index of a last symbol of the SL PRS resource by 1.

8. The method of claim 1, wherein, based on that the SL PRS resource is an aggregated resource of N SL PRS resources, an index of a start symbol of the switching gap is greater than an index of a last symbol included in the aggregated resource by 1, and wherein the N is a positive integer.

9. The method of claim 8, wherein a maximum value of the N is configured in a resource pool or pre-configured.

10. The method of claim 1, wherein a start time and an end time of the switching gap are configured through a SL PRS control channel (CCH) related to the first SL PRS.

11. The method of claim 1, wherein the information related to the PRS includes a positioning result based on the first SL PRS, and wherein the positioning result based on the first SL PRS is transmitted on the first SL resource.

12. The method of claim 1, wherein the information related to the PRS includes an acknowledgement (ACK) signal indicating a success in transmission of the first SL PRS or a negative acknowledgement (NACK) signal indicating a fail in transmission of the first SL PRS, and wherein the ACK signal or the NACK signal being transmitted on the first SL resource.

13. A first device comprising:

at least one transceiver;

at least one processor; and at least one memory connected to the at least one processor and storing instructions that, based on being executed, cause the first device to perform operations comprising:

obtaining sidelink (SL) Positioning Reference Signal (PRS) resource configuration, wherein the SL PRS resource configuration includes information related to a SL PRS comb size of a SL PRS resource and information related to a number of symbols included in the SL PRS resource;

transmitting, to a second device, a first SL PRS on the SL PRS resource; and receiving, from the second device, information related to a PRS on a first SL resource after the SL PRS resource, wherein a switching gap for receiving the information related to the PRS is determined. based on the information related to the SL PRS comb size of the SL PRS resource and information related to the number of symbols included in the SL PRS resource.

14. The first device of claim 13, wherein an index of a start symbol of the switching gap is greater than an index of a last symbol of the SL PRS resource by 1.

15. The first device of claim 13, wherein, based on that the SL PRS resource is an aggregated resource of N SL PRS resources, an index of a start symbol of the switching gap is greater than an index of a last symbol included in the aggregated resource by 1, and wherein the N is a positive integer.

16. A processing device adapted to control a first device to perform wireless communication, the processing device comprising:

at least one processor; and at least one memory connected to the at least one processor and storing instructions that, based on being executed, cause the at least one processor to perform operations comprising:

obtaining sidelink (SL) Positioning Reference Signal (PRS) resource configuration, wherein the SL PRS resource configuration includes information related to a SL PRS comb size of a SL PRS resource and information related to a number of symbols included in the SL PRS resource;

transmitting, to a second device, a first SL PRS on the SL PRS resource; and receiving, from the second device, information related to a PRS on a first SL resource after the SL PRS resource, wherein a switching gap for receiving the information related to the PRS is determined, based on the information related to the SL PRS comb size of the SL PRS resource and information related to the number of symbols included in the SL PRS resource.

17. The processing device of claim 16, wherein an index of a start symbol of the switching gap is greater than an index of a last symbol of the SL PRS resource by 1.

* * * * *